US012091240B2

(12) United States Patent
Stiglic et al.

(10) Patent No.: US 12,091,240 B2
(45) Date of Patent: Sep. 17, 2024

(54) THERMOPLASTIC FILMS AND BAGS WITH DUAL FRAGRANCE ODOR CONTROL AND METHODS OF MAKING THE SAME

(71) Applicant: THE GLAD PRODUCTS COMPANY, Oakland, CA (US)

(72) Inventors: Jeffrey S Stiglic, Willowbrook, IL (US); Dean A Ferracane, Willowbrook, IL (US); Edward B Tucker, Willowbrook, IL (US); Jacqueline E Yee, Cincinnati, OH (US); Christopher G Anderson, Cincinnati, OH (US)

(73) Assignee: The Glad Products Company, Oakland, CA (US)

(*) Notice: Subject to any disclaimer, the term of this patent is extended or adjusted under 35 U.S.C. 154(b) by 255 days.

(21) Appl. No.: 17/570,839

(22) Filed: Jan. 7, 2022

(65) Prior Publication Data

US 2022/0219890 A1 Jul. 14, 2022

Related U.S. Application Data

(60) Provisional application No. 63/136,300, filed on Jan. 12, 2021.

(51) Int. Cl.
*B65F 1/00* (2006.01)
*C08J 5/18* (2006.01)
*C08J 7/06* (2006.01)

(52) U.S. Cl.
CPC .............. *B65F 1/0026* (2013.01); *C08J 5/18* (2013.01); *C08J 7/06* (2013.01); *B65F 2250/114* (2013.01); *C08J 2300/22* (2013.01)

(58) Field of Classification Search
CPC .................................. B65F 1/0026; C08J 5/18
See application file for complete search history.

(56) References Cited

U.S. PATENT DOCUMENTS

| 2007/0014992 | A1* | 1/2007 | Longmoore | B32B 7/02 |
| | | | | 428/521 |
| 2009/0067760 | A1* | 3/2009 | Shelley | B65D 81/28 |
| | | | | 264/238 |
| 2011/0164834 | A1* | 7/2011 | Stiglic | B31B 70/8135 |
| | | | | 383/75 |
| 2017/0008261 | A1* | 1/2017 | Jean-Mary | B32B 27/08 |
| 2017/0216166 | A1* | 8/2017 | Sasaki | A61K 8/8129 |
| 2018/0118415 | A1* | 5/2018 | Jean-Mary | B31B 70/8134 |
| 2019/0152693 | A1* | 5/2019 | Cobler | B65D 33/28 |

FOREIGN PATENT DOCUMENTS

WO WO 2020/072202 A1 4/2020

OTHER PUBLICATIONS

International Search Report & Written Opinion as received in PCT/US2022/011597 dated Mar. 21, 2022.

* cited by examiner

*Primary Examiner* — Derek J Battisti
(74) *Attorney, Agent, or Firm* — Keller Preece PLLC

(57) ABSTRACT

The present disclosure relates to a thermoplastic film that includes dual fragrance odor control. For example, the thermoplastic can film include a first fragrance component, such as a neat oil applied directly thereon. The thermoplastic film can also include an encapsulated fragrance component applied thereon. The encapsulated fragrance component can include a fragrance encapsulated within a plurality of encapsulants and can be configured to delay a release of the fragrance, such as until there is a physical interaction applied to the thermoplastic film.

20 Claims, 15 Drawing Sheets

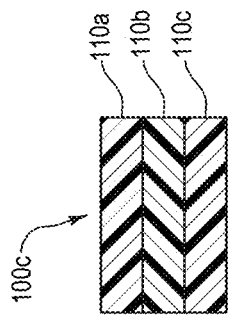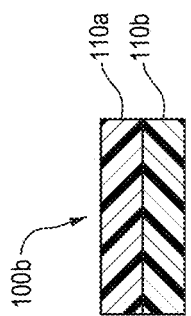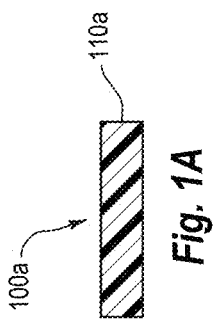

THERMOPLASTIC FILMS AND BAGS WITH DUAL FRAGRANCE ODOR CONTROL AND METHODS OF MAKING THE SAME

CROSS-REFERENCE TO RELATED APPLICATIONS

This application claims priority to and the benefit of U.S. Provisional Patent Application No. 63/136,300, filed on Jan. 12, 2021, which is incorporated herein by reference in its entirety.

BACKGROUND

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

In regard to trash bags formed from thermoplastic films, responding to malodors from materials placed in trash bags (e.g., trash) is a significant concern. In particular, each article of trash placed into a trash bag may function as a source of malodor, and many articles of trash may produce detectably potent malodors. These potent malodors can spread within the trash bag and throughout a surrounding area, causing proximity to the trash bag to be undesirable. In some instances, the malodors emanating from the trash within a trash bag become objectionable enough that the user performs a compensating behavior, such as replacing the trash bag before it is full. Accordingly, the user does not receive the full benefit of the trash bag (e.g., is not able to fill the trash bag to capacity).

Some trash bag manufacturers may apply a fragrance to the trash bag to help control (e.g., mask) the malodors produced by the trash within the trash bag. However, such trash bags typically have a limited supply of fragrance. Further, the fragrance that is applied to a trash bag is typically depleted before the user has finished using the bag. For example, manufacturers may apply a fragrance to a trash bag as a neat oil that evaporates within the first one or two days of use. Accordingly, though the trash bag may initially be able to control malodors via the fragrance, its efficacy will fade over time, allowing the malodors to increase in potency and eventually overwhelm the fragrance. In some instances, the neat oil begins to evaporate soon after manufacture and/or while in the packaging material, leaving less fragrance available by the time the user purchases or utilizes the trash bag.

Further, a trash bag having a fragrance applied thereon is typically unable to convey the effectiveness of the fragrance in controlling any present malodors after a certain amount of time has passed. For example, when a user becomes accustomed to the scent associated with the fragrance, the trash bag is unable to indicate use of the fragrance to control any present malodors. Accordingly, the trash bag may fail to instill a belief that the trash bag is operating as desired.

Accordingly, there are a number of considerations to be made in thermoplastic films and controlling malodors emanating from materials placed within the thermoplastic films.

SUMMARY

One or more embodiments of the present disclosure provide benefits and/or solve one or more of the foregoing or other problems in the art with thermoplastic films and bags that provide dual fragrance odor control. For example, in one or more embodiments, a thermoplastic film includes a first fragrance component and an encapsulated fragrance component applied to a layer of thermoplastic material. The encapsulated fragrance component can include a fragrance encapsulated within a plurality of encapsulants that can delay the release of the fragrance. The fragrance of the encapsulated fragrance component can include the same scent as a fragrance of the first fragrance component, a different but related scent (e.g., within the same family of scents), or a different and unrelated scent. As the encapsulated fragrance component activates to release the fragrance, the thermoplastic film provides a boost of fragrance, indicating performance of the thermoplastic film in controlling malodors.

One or more embodiments include a film comprising a first layer of thermoplastic material, a first fragrance component applied to the first layer of thermoplastic material, and an encapsulated fragrance component applied to the first layer of thermoplastic material. The encapsulated fragrance component comprises a fragrance encapsulated within a plurality of encapsulants and is configured to delay a release of the fragrance.

One or more further embodiments include a thermoplastic bag comprising a first sidewall and a second sidewall opposite the first sidewall and joined with the first sidewall along a first side edge, an opposite second side edge, and a bottom edge. The thermoplastic bag also includes a first fragrance component applied to at least one of the first sidewall or the second sidewall and an encapsulated fragrance component applied to at least one of the first sidewall or the second sidewall. The encapsulated fragrance component comprises a fragrance encapsulated within a plurality of encapsulants and is configured to delay a release of the fragrance.

Additionally, one or more embodiments include a method of manufacturing thermoplastic bags having dual fragrance odor control. The method involves providing a thermoplastic film, applying a first fragrance component to the thermoplastic film, and applying an encapsulated fragrance component to the thermoplastic film. The encapsulated fragrance component comprises a fragrance encapsulated within a plurality of encapsulants and is configured to delay a release of the fragrance. The method also involves forming the thermoplastic film into a bag.

Additional features and advantages of exemplary implementations of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims or may be learned by the practice of such exemplary embodiments as set forth hereinafter.

BRIEF DESCRIPTION OF THE DRAWINGS

In order to describe the manner in which the above recited and other advantages and features of the present disclosure can be obtained, a more particular description of the present disclosure briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the present disclosure and are not therefore to be considered to be limiting of its scope, the present disclosure will be described and explained with additional specificity and detail through the use of the accompanying drawings in which:

FIGS. 1A-1C illustrate partial side cross-sectional views of thermoplastic films having a variety of layers;

DETAILED DESCRIPTION

Figure 2:
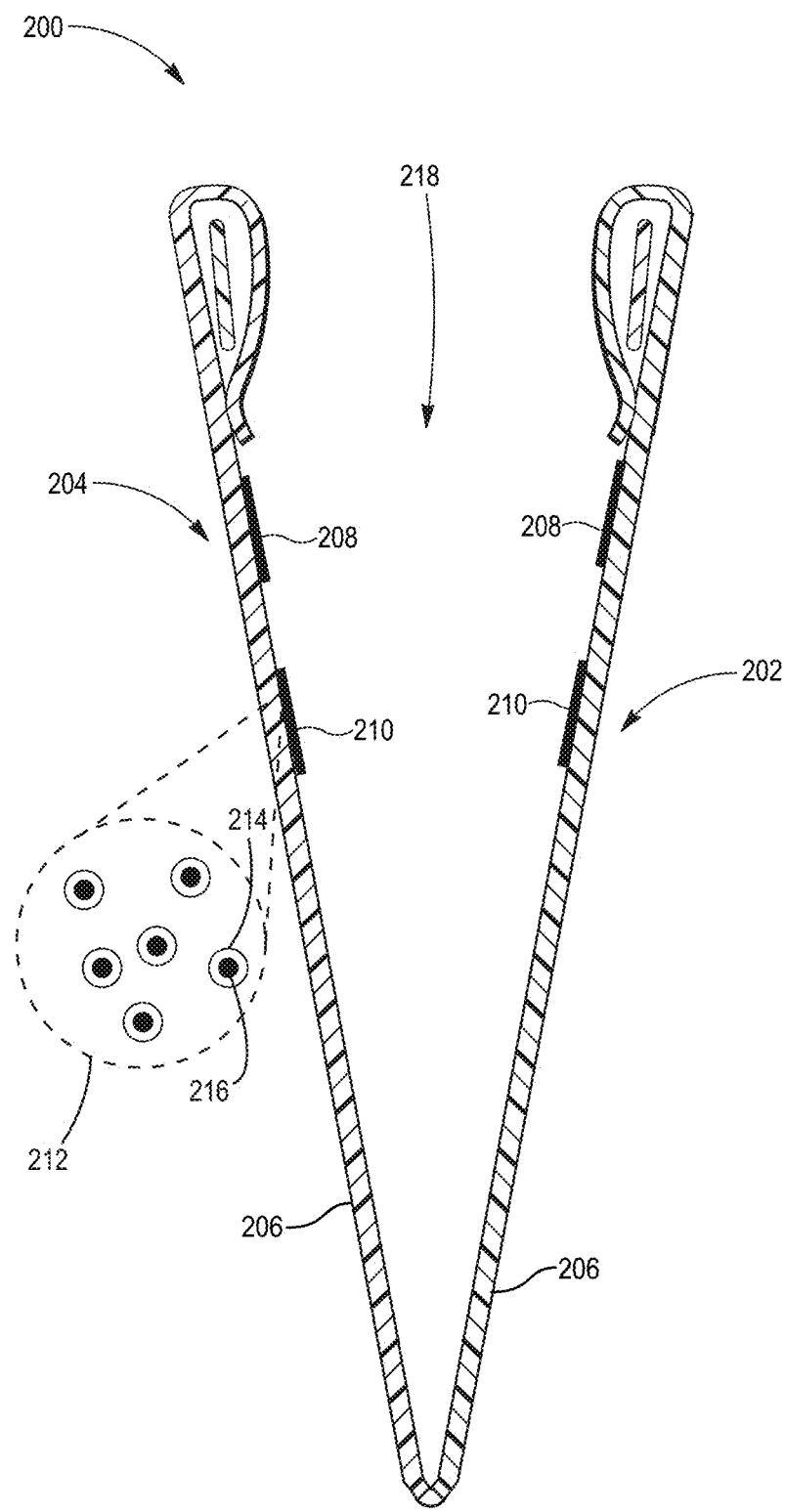
FIG. 2 illustrates a side cross-sectional view of a thermoplastic bag having dual fragrance odor control in accordance with one or more embodiments.

One or more embodiments of the present disclosure include dual fragrance odor control based on encapsulation of a fragrance. For example, in one or more embodiments, a thermoplastic film or bag includes multiple fragrance components disposed thereon. For example, in some embodiments, the thermoplastic film or bag includes a first fragrance component—such as a neat oil having a fragrance—and an encapsulated fragrance component applied thereon. The encapsulated fragrance component can encapsulate a fragrance (having the same scent, a different scent, or a related scent as the fragrance of the first fragrance component) within a plurality of encapsulants. The encapsulated fragrance component can further be configured to delay a release of the fragrance from the encapsulants so that little, to no, fragrance is released until the encapsulated fragrance component is activated.

As mentioned above, the thermoplastic film or bag can include a first fragrance component disposed thereon. In one or more embodiments, the first fragrance component comprises a fragrance that is non-encapsulated. For example, the first fragrance component can include a neat oil applied directly onto the thermoplastic film or bag.

As further mentioned, the thermoplastic film or bag can include an encapsulated fragrance component that is distinct from the first fragrance component. In particular, the encapsulated fragrance component can include a fragrance within a plurality of encapsulants. As mentioned, the fragrance can include the same scent as a scent associated with the first fragrance component, a related scent, or a different scent that is unrelated. When the encapsulated fragrance component includes a fragrance having the same scent as the scent associated with the first fragrance component, the thermoplastic film or bag provides a fragrance boost. When the encapsulated fragrance component includes a fragrance having a different scent, the thermoplastic film or bag further provides a changing fragrance experience. In some implementations, the first fragrance component comprises an additional encapsulated fragrance component so that the thermoplastic film or bag includes multiple encapsulated fragrance components.

In one or more embodiments, the encapsulated fragrance component is coextruded with the thermoplastic material of the thermoplastic film or bag so that the encapsulated fragrance component is embedded into the material itself. In some embodiments, the encapsulated fragrance component is applied to the thermoplastic material after extrusion (e.g., using a liquid or a powder application). For example, the encapsulated fragrance component can be disposed onto a surface of the thermoplastic material (e.g., in a pattern—such as a strip, a series of dots, or other predetermined pattern—or as a complete layer covering the surface either partially or fully), within a hem of the thermoplastic material, or between a first layer and a second layer of the thermoplastic material.

Further, as mentioned above, in one or more embodiments, the encapsulated fragrance component is configured to delay a release of the fragrance. In particular, in some embodiments, the plurality of encapsulants are configured to delay release of the fragrance until activated. For example, in some implementations, the plurality of encapsulants are configured to retain the fragrance until activated by a physical interaction applied to the thermoplastic film. In response to the physical interaction, the plurality of encapsulants can release the fragrance thus providing odor control. Thus, the thermoplastic film or bag is able to retain the fragrance until, for example, there is a consumer interaction with the thermoplastic film or bag (e.g., placing a trash bag in a trash bin or throwing an article of trash into the trash bag). In some instances, the plurality of encapsulants are configured to retain the fragrance until activated by contact with moisture (e.g., water vapor particles). In yet further embodiments, the plurality of encapsulants are configured to release the fragrance via diffusion. For example, the plurality of encapsulants can gradually release the fragrance over time as will be discussed in more detail below. Accordingly, the thermoplastic film or bag reduces the amount of fragrance that is depleted after manufacture and before purchase. Additionally, the thermoplastic film or bag extends the availability of the encapsulated fragrance component for instances where odor control is needed. Upon activation, the encapsulated fragrance component further provides a boost of fragrance, indicating performance of the thermoplastic film or bag in controlling malodors.

Thus, the first fragrance component provides a primary or first fragrance experience. As the primary fragrance experience fades or in response to an activation trigger, the encapsulated fragrance experience provides a secondary or supplementary fragrance experience. This dual fragrance experience can help ensure that a fragrance is detectable longer than conventional fragrance technologies. Additionally, the secondary fragrance experience can activate in response to consumer interaction points, exposure to moisture (e.g., water vapor particles), or exposure to particles of a particular pH level or within a particular pH range (e.g., malodor particles emitted by articles of trash). Thus, the secondary fragrance experience can signal to the user that the bag is fighting odors as needed. Along related lines, when the encapsulated fragrance differs from the primary fragrance, the release of the encapsulated fragrance can provide increased noticeability if the user has become habituated to the primary fragrance or otherwise provide a surprising experience.

As illustrated by the foregoing discussion, the present disclosure utilizes a variety of terms to describe feature and benefits of one or more embodiments. Additional detail is now provided regarding the meaning of these terms. As used herein, the term "odor" refers to any substance that can stimulate an olfactory response in a human; i.e., sense of smell. As used herein, the term "malodor" and any of its derivative terms refers to an odor that is generally considered unpleasant, obnoxious, or nauseating by the general population, such as the broad spectrum of odors associated with household trash, including odors related to stale urine, feces, vomitus, and putrefying organic materials, e.g., food waste, in common household trash. As used herein, the term "malodor particle" refers to a particle or molecule that carries a malodor. Though it will be understood that a malodor particle includes any particle or molecule that carries a malodor, examples of malodor particles include those derived from sulfide chemistries (e.g., dipropyl trisulfide, propyl mercaptan, dimethyl sulfide, dimethyl trisulfide, methal mercaptan, hydrogen sulfide, etc.), nitrogen chemistries (e.g., trimethylamine, trimethylamine, etc.), or fatty acids, aldehydes, keytones, and/or ester (e.g., demascenone, nonenal, pentanal, methinoal, pentyl acetate, etc.).

In contrast to a malodor, as used herein, the term "fragrance" refers to any mixture or composition comprising one or more perfume raw materials with or without one or more carrier solvents configured to emit a pleasant odor. In particular, a fragrance can refer to a mixture or composition having an odor that is generally considered clean, inviting, aromatic pleasant, or desirable. For example, a fragrance can include, but is not limited to, a substance having an odor associated with fruit, flowers or other vegetation, or baked goods. A fragrance can include one or more gaseous, liquid, colloidal suspension, and/or solid substances. In one or more embodiments, the fragrance includes a volatile fragrance material (i.e., a fragrance material capable of being transported to the olfactory system). For example, the fragrance can include top, middle, and/or bottom notes composed of aromatic materials and other functional groups (e.g., ketones, aldehydes, alcohols, etc.). In some embodiments, the fragrance comprises functional perfume raw materials (e.g., neutralizing chemistries—such as reactive aldehydes—or perceptual modifiers—such as receptor blockers). As used herein the term "perfume" refers to a compound utilized for its appealing odor. Compounds may have a pleasing odor without being used as a perfume in the context of this disclosure.

Relatedly, as used herein, the term "scent" refers to a type of odor. For example, a scent can refer to a type of odor associated with a fragrance. To illustrate, a fragrance having an odor that smells like a particular fruit can be described as having a scent of that fruit or being "scented" to smell like that fruit. A fragrance can be derived directly from the source associated with its scent (e.g., by including particles from the source in the substance) or fabricated from other sources (natural or synthetic).

Additionally, as used herein, the term "fragrance component" refers to a structure or compound that includes a fragrance. For example, a fragrance component can include an encapsulated fragrance component or a neat oil or other non-encapsulated compound that includes a fragrance. As used herein, the term "encapsulated fragrance component" or "encapsulated fragrance" more particularly refers to a structure or compound that includes one or more encapsulants and a fragrance encapsulated within the one or more encapsulants.

As used herein, the term "encapsulant" refers to a composition capable of, at least partially, encapsulating another composition, such as a fragrance (or other odor-control active). In particular, an encapsulant can bond to, or enclose, a fragrance (or other odor-control active). For example, the encapsulant can include a shell or matrix composition that surrounds a fragrance. In one or more embodiments, the encapsulant is configured to release the fragrance in response to an activation trigger. For example, the encapsulant can be configured to release the fragrance in response to a physical interaction applied to a thermoplastic film or bag upon which the encapsulant is disposed, such as a physical strain or a friction applied to the thermoplastic film or bag. To illustrate, the encapsulant can include, but is not limited to, a composition made of melamine-formaldehyde, polyuria, polyacrylates, starch, polysaccharides, betacyclodextrins/cyclodextrins, or other polymers, waxes, etc. As a non-limiting example, the encapsulant can include a formaldehyde-based shell that is pliable in liquid form (e.g., used to apply the encapsulant to the thermoplastic film or bag) and becomes brittle as it dries. Thus, physical interactions applied to the thermoplastic film can cause the plurality of encapsulants to break open when dried.

In some embodiments, the encapsulant is configured to release the fragrance in response to the presence of malodor particles. For example, the encapsulant can be configured to release the fragrance in response to the presence of particles/materials having sulfide chemistries, nitrogen chemistries, fatty acids, aldehydes, ketones, ester, or other malodor particles. As non-limiting examples, the encapsulant can comprise a crystalline lattice composed of basic material that breaks down in the presence of a volatile fatty acid (or other low pH malodors) due to acid-base reactions, releasing the fragrance. As another non-limiting example, the encapsulant can include a flexible matrix (e.g., a matrix created with polymer chains) that encapsulates both the fragrance and another material, such as a transition metal particle. The other material can react with a malodor (e.g., thiol or mercaptan), when present, relaxing the walls of the matrix and allowing the fragrance to be released.

Additionally, the encapsulant can be configured to release the fragrance in response to vapor phase contact with malodor particles (i.e., the encapsulant need not touch the malodor source). In alternative embodiments, the encapsulant can be configured to release the fragrance in response to direct physical contact with the malodor source.

In some embodiments, an encapsulant includes a gel/polymer film configured to delay the release of an encapsulated fragrance (or other odor-control active). In some implementations, an encapsulant includes a water soluble or otherwise water-triggered material. In further embodiments, the encapsulant can include materials that release an encapsulated fragrance (or other odor-control active) in response to a chemical reaction or the presence of oxygen.

In one or more embodiments, an encapsulated fragrance component is configured with a porosity characteristic. As used herein, the term "porosity characteristic" refers to a characteristic of an encapsulated fragrance component to release at least a portion of a fragrance (e.g., a fragrance encapsulated within one or more encapsulants) over time. In particular, a porosity characteristic can refer to a characteristic of an encapsulant to release at least a portion of a fragrance over time.

As used herein, the term "physical interaction" refers to a physical force applied to a thermoplastic film or bag. In particular, a physical interaction can refer to a physical manipulation of a thermoplastic film or bag (or a portion thereof) or a physical contact between a physical object and the thermoplastic film or bag. For example, a physical interaction can include, but is not limited to, a physical strain applied to a thermoplastic film or bag (or a portion thereof), a friction applied to a thermoplastic film or bag, or a touch of a thermoplastic film or bag (e.g., by a user or an article of trash).

As used herein, the terms "lamination," "laminate," and "laminated film," refer to the process and resulting product made by bonding together two or more layers of film or other material. The term "bonding", when used in reference to bonding of multiple layers of a multi-layer film, may be used interchangeably with "lamination" of the layers. According to methods of the present disclosure, adjacent layers of a multi-layer film are laminated or bonded to one another. The bonding purposely results in a relatively weak bond between the layers that has a bond strength that is less than the strength of the weakest layer of the film. This allows the lamination bonds to fail before the film layer, and thus the bond, fails.

The term laminate is also inclusive of coextruded multi-layer films comprising one or more tie layers. As a verb, "laminate" means to affix or adhere (by means of, for example, adhesive bonding, pressure bonding, ultrasonic bonding, corona lamination, and the like) two or more separately made film articles to one another so as to form a multi-layer structure. As a noun, "laminate" means a product produced by the affixing or adhering just described.

As used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbounded areas in either the machine direction or the transverse direction or both. Both partially discontinuous and discontinuous are types of non-continuous bonding (i.e., bonding that is not complete and continuous between two surfaces).

In addition to non-continuous bonding, one or more implementations include incrementally stretching a thermoplastic film. For example, one or more implementations includes incrementally stretching a thermoplastic film using MD ring rolling, TD ring rolling, DD ring rolling, the formation of strainable networks, or combinations thereof. Incrementally stretching a thermoplastic film using the methods described herein can impart ribs or other structures to the film and increase or otherwise modify one or more of the tensile strength, tear resistance, impact resistance, or elasticity of the film. Furthermore, one or more embodiments involve stretching processes with ambient or cold (non-heated) conditions. This differs significantly from most conventional processes that stretch films under heated conditions. Stretching under ambient or cold conditions in accordance with one or more implementations can constrain the molecules in the thermoplastic film so they are not as easily oriented as under heated conditions. Such cold incremental stretching can help provide the unexpected result of maintaining or increasing the strength of a thermoplastic film, despite a reduction in gauge.

Relatively weak bonding and stretching can be accomplished simultaneously through one or more suitable techniques. For example, bonding and stretching may be achieved by pressure (for example MD ring rolling, TD ring rolling, helical or DD ring rolling, stainable network lamination, or embossing), or with a combination of heat and pressure. Alternately, a manufacturer can first stretch the films and then bond the films using one or more bonding techniques. For example, one or more implementations can include ultrasonic bonding to lightly laminate the films. Alternately or additionally, adhesives can laminate the films. Treatment with a Corona discharge can enhance any of the above methods. In one or more embodiments, the contacting surfaces/layers can comprise a tacky material to facilitate lamination. Prior to lamination, the separate films can be subject to separate processes, such as stretching, slitting, coating and printing, and corona treatment or can be not subject to any separate process.

As used herein, the term "substantially," in reference to a given parameter, property, or condition, means to a degree that one of ordinary skill in the art would understand that the given parameter, property, or condition is met within a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain, and when the applied strain is released the web materials return, to a degree, to their pre-strained condition.

As used herein, any relational terms such as "first," "second," and "third," "inner," "outer," "upper," "lower," "side," "top," "bottom," etc. are for clarity and convenience in understanding the present disclosure and accompanying drawings and does not connote or depend on any specific preference, orientation, or order, except where the context clearly indicates otherwise. For example, the relational terms may refer an orientation of a multi-layer bag while disposed within a receptacle (e.g., a trash can) for use.

Film Materials

As an initial matter, the thermoplastic material of the films of one or more implementations can include, but are not limited to, thermoplastic polyolefins, including polyethylene and copolymers thereof and polypropylene and copolymers thereof. The olefin based polymers can include the most common ethylene or propylene based polymers such as polyethylene, polypropylene, and copolymers such as ethylene vinylacetate (EVA), ethylene methyl acrylate (EMA) and ethylene acrylic acid (EAA), or blends of such polyolefins.

Other examples of polymers suitable for use as films in accordance with the present disclosure may include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), oriented poly(ethylene-terephthalate), poly(ethylene-butylacrylate), polyurethane, poly(ethylene-propylene-diene), ethylene-propylene rubber, nylon, etc.

Some of the examples and description herein below refer to films formed from linear low-density polyethylene. The term "linear low density polyethylene" (LLDPE) as used herein is defined to mean a copolymer of ethylene and a minor amount of an olefin containing 4 to 10 carbon atoms, having a density of from about 0.910 to about 0.926, and a melt index (MI) of from about 0.5 to about 10. For example, some examples herein use an octene comonomer, solution phase LLDPE (MI=1.1; ρ=0.920). Additionally, other examples use a gas phase LLDPE, which is a hexene gas phase LLDPE formulated with slip/AB (MI=1.0; p=0.920). Still further examples use a gas phase LLDPE, which is a hexene gas phase LLDPE formulated with slip/AB (MI=1.0; ρ=0.926). One will appreciate that the present disclosure is not limited to LLDPE, and can include "high density polyethylene" (HDPE), "low density polyethylene" (LDPE), and "very low density polyethylene" (VLDPE). Indeed, films made from any of the previously mentioned thermoplastic materials or combinations thereof can be suitable for use with the present disclosure.

Some embodiments of the present disclosure may include any flexible or pliable thermoplastic material that may be formed or drawn into a web or film. Furthermore, each thermoplastic film may include a single layer or multiple layers of thermoplastic materials as described in further detail below in regard to FIGS. 1A-1C. The thermoplastic material may be opaque, transparent, translucent, or tinted. Furthermore, the thermoplastic material may be gas permeable or impermeable.

Additional additives that may be included in one or more embodiments include slip agents, anti-block agents, voiding agents, or tackifiers. Additionally, one or more implementations of the present disclosure include films that are devoid of voiding agents. Some examples of inorganic voiding agents, which may further provide odor control, include the following but are not limited to: calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, charcoal, zeolites, any combination thereof, etc. Organic voiding agents, polymers that are immiscible in the major polymer matrix, can also be used. For instance, polystyrene can be used as a voiding agent in polyethylene and polypropylene films.

Further additives that may be included in one or more embodiments include natural oils. For example, the additives may include thyme oil, mint oil, lemon grass oil, tea tree oil, cinnamon bark oil, methyl jasmonate, etc. Yet further additives may include zinc pyrithione ("ZPT") and copper pyrithione ("CPT"), which inhibit microbial growth.

One of ordinary skill in the art will appreciate in view of the present disclosure that manufacturers may form the films or webs to be used with the present disclosure using a wide variety of techniques. For example, a manufacturer can form a precursor mix of the thermoplastic material and one or more additives. The manufacturer can then form the film(s) from the precursor mix using conventional flat or cast extrusion or coextrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. This is related to the different physical characteristics possessed by films made by the two conventional film-making processes; casting and blowing. Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (monoaxial orientation), the resulting film can exhibit strength and stiffness along the direction of stretch, but can be weak in the other direction (i.e., across the stretch), often splitting when flexed or pulled. To overcome this limitation, two-way or biaxial orientation can be employed to more evenly distribute the strength qualities of the film in two directions. Most biaxial orientation processes use apparatus that stretches the film sequentially, first in one direction and then in the other.

In one or more implementations, the films of the present disclosure are blown film, or cast film. Blown film and cast film is formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present disclosure, can be a single screw type modified with a blown film die, an air ring, and continuous take off equipment.

In one or more embodiments, a manufacturer can use multiple extruders to supply different melt streams, which a feed block can order into different channels of a multi-channel die. The multiple extruders can allow a manufacturer to form a multi-layer film with layers having different compositions. Such multi-layer film may later be non-continuously laminated with another layer of film.

In a blown film process, the die can be an upright cylinder with a circular opening. Rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more embodiments, the extrusion process can orient the polymer chains of the blown film. In particular, the extrusion process can cause the polymer chains of the blown film to be predominantly oriented in the machine direction. The orientation of the polymer chains can result in an increased strength in the direction of the orientation. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more embodiments the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more embodiments the polymer chains of the blown film are predominantly oriented in the machine direction (i.e., oriented more in the machine direction than the transverse direction).

The films of one or more implementations of the present disclosure can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.3 mils and about 0.5 mils. Additionally, the starting gauge of films of one or more implementations of the present disclosure may not be uniform. Thus, the starting gauge of films of one or more implementations of the present disclosure may vary along the length and/or width of the film.

As an initial matter, one or more layers of the films described herein can comprise any flexible or pliable material comprising a thermoplastic material and that can be formed or drawn into a web or film. As described above, the film includes a plurality of layers of thermoplastic films. Each individual film layer may itself include a single layer or multiple layers. In other words, the individual layers of the multi-layer film may each themselves comprise a plurality of laminated layers. Such layers may be significantly more tightly bonded together than the bonding provided by the purposely weak discontinuous bonding in the finished multi-layer film. Both tight and relatively weak lamination can be accomplished by joining layers by mechanical pressure, joining layers with adhesives, joining with heat and pressure, spread coating, extrusion coating, and combinations thereof. Adjacent sub-layers of an individual layer may be coextruded. Coextrusion results in tight bonding so that the bond strength is greater than the tear resistance of the resulting laminate (i.e., rather than allowing adjacent layers to be peeled apart through breakage of the lamination bonds, the film will tear).

The following discussion provides more detail with regard to one or more embodiments with reference to the figures. One or more embodiments of the present disclosure include products made from or with thermoplastic films and that include an encapsulated fragrance component. For example, such products include, but are not limited to, grocery bags, trash bags, sacks, and packaging materials, feminine hygiene products, baby diapers, adult incontinence products, or other products. For ease in description, however, the figures and bulk of the following disclosure focuses on films and bags. One will further appreciate that the teachings and disclosure equally applies to other products as well. For example, some embodiments of the present disclosure include nonwovens in place of the films described herein. Additional embodiments of the present disclosure include other materials in place of the films described herein.

Referring now to the figures, FIGS. 1A-1C are partial cross-sectional views of thermoplastic films that may be used in one or more embodiments. For example, FIG. 1A illustrates a thermoplastic film 100a having a single first layer 110a. In other embodiments, as illustrated by FIG. 1B, a thermoplastic film 100b can have two layers (i.e., a bi-layer film). In particular, the thermoplastic film 100b can include a first layer 110a and a second layer 110b. In such embodiments, the first and second layers 110a-110b may optionally include different grades of thermoplastic material and/or include different additives, including polymer additives. In yet other embodiments, as shown in FIG. 1C, a thermoplastic film 100c may include three layers (i.e., a tri-layer film). In particular, the thermoplastic film 100c can include a first layer 110a, a second layer 110b, and a third layer 110c. In yet other embodiments, a thermoplastic film can include more than three layers. In one or more embodiments, the layers of the thermoplastic film (e.g., one of the thermoplastic films 100a-100c) are coextruded.

FIG. 2 illustrates a side cross-sectional view of a thermoplastic bag 200 having dual fragrance odor control based on encapsulation of a fragrance in accordance with one or more embodiments. As shown in FIG. 2, each of the first sidewall 202 and the second sidewall 204 of the thermoplastic bag 200 includes a single layer of thermoplastic film 206. The thermoplastic film 206 of the first sidewall 202 and the second sidewall 204 can include any of the thermoplastic films described above. In one or more embodiments, each of the first and second sidewalls 202, 204 of the thermoplastic bag 200 includes multiple layers of thermoplastic film as will be discussed in more detail with reference to FIGS. 6A-6B.

Additionally, as shown in FIG. 2, the thermoplastic bag 200 includes a first fragrance component disposed as a first strip 208 onto the first sidewall 202 and the second sidewall 204. As mentioned above, in one or more embodiments, the first fragrance component of the first strip 208 includes a neat oil (or other non-encapsulated compound) applied directly to the first sidewall 202 and the second sidewall 204. Further, the first fragrance component includes a fragrance having a scent. Though not shown, some embodiments involve coextruding the first fragrance component with the first sidewall 202 (i.e., embedding the fragrance control component as an additive into the thermoplastic film forming the first sidewall 202 during the extrusion process) as discussed above.

Additionally, as shown in FIG. 2, the thermoplastic bag 200 includes a second fragrance component—an encapsulated fragrance component 212—disposed as a second strip 210 onto the first sidewall and the second sidewall 204. The encapsulated fragrance component 212 includes a fragrance encapsulated within a plurality of encapsulants, such as the fragrance 216 (or, more specifically, a portion—e.g., one or more molecules or particles—of the fragrance) encapsulated within the encapsulant 214. Though not shown, some embodiments involve coextruding the encapsulated fragrance component 212 with the first and second sidewalls 202, 204 (i.e., embedding the encapsulated fragrance component 212 as an additive into the thermoplastic film forming the second sidewall 204 during the extrusion process) as discussed above.

As mentioned above, in one or more embodiments, the fragrance of the encapsulated fragrance component 212 includes a scent that is the same as the scent associated with the first fragrance component. In some embodiments, the fragrance of the encapsulated fragrance component 212 includes a scent that is different than but related to the scent associated with the first fragrance component (e.g., both include different scents that are within the same family or group of scents). In still further embodiments, the fragrance of the encapsulated fragrance component 212 includes a scent that is different than, and unrelated to, the scent associated with the first fragrance component (e.g., they include different scents that are part of different families or groups of scents).

Further, as mentioned above, in one or more embodiments, the encapsulated fragrance component 212 is configured to delay a release of the fragrance from the plurality of encapsulants. For example, in one or more embodiments, the encapsulated fragrance component 212 retains the fragrance within the plurality of encapsulants until activated to release the fragrance in response to a physical interaction applied to the thermoplastic bag 200. More particularly, the encapsulated fragrance component 212 can retain the fragrance within the plurality of encapsulants until activated to release the fragrance in response to a physical interaction applied to the first or second sidewall 202, 204 or to a portion of the first or second sidewall 202, 204 adjacent to or contacting the second strip 210. For example, in some embodiments, the encapsulated fragrance component 212 can be activated to release the fragrance in response to a physical strain or a friction applied to the thermoplastic bag 200 (or, more specifically, applied to the first or second sidewall 202, 204 or to a portion of the first or second sidewall 202, 204 adjacent to or contacting the second strip 210).

Thus, in one or more embodiments, the thermoplastic bag 200 is configured to provide extended odor control. For example, in some implementations, the first fragrance component disposed as the first strip 208 begins to volatize before the encapsulated fragrance component 212 activates to release its respective fragrance. Indeed, the first fragrance component (e.g., as a neat oil) can begin to volatize after application onto the thermoplastic bag 200 (e.g., immediately after application or as the thermoplastic bag 200 is opened for use). Accordingly, the first fragrance component (including its respective fragrance) may be depleted before any malodor sources are deposited into the thermoplastic bag 200 or otherwise within the early stages of use of the thermoplastic bag 200. By including the encapsulated fragrance component 212, the thermoplastic bag 200 can be configured to provide additional odor control after the strength of the first fragrance component weakens or expires. Indeed, by retaining its respective fragrance until activation, the encapsulated fragrance component 212 can provide additional fragrance for odor control after the first fragrance component has depleted.

As mentioned briefly above, the first fragrance component is disposed as the first strip 208 onto the first and second sidewalls 202, 204, and the encapsulated fragrance component 212 is disposed as the second strip 210 onto the first and second sidewalls 202, 204. As shown in FIG. 2, the first strip 208 and the second strip 210 can be disposed on an interior surface of the respective sidewalls (i.e., the surface of the sidewall facing the opening 218 of the thermoplastic bag 200). In some embodiments, however, the first strip 208 and/or the second strip 210 are disposed on an exterior surface of the respective sidewall. Additionally, though FIG. 2 illustrates the first strip 208 and the second strip 210 positioned near the top of the respective sidewall, in one or more embodiments, the strips can be positioned lower.

While FIG. 2 illustrates the first fragrance component and the encapsulated fragrance component 212 disposed in the form of a strip, in other embodiments, the first fragrance component and/or the encapsulated fragrance component can be applied to the thermoplastic bag 200 in other forms. For example, the first fragrance component and/or the encapsulated fragrance component can be applied as a dot, streak, or in a full surface application.

Additionally, while the above discusses the first fragrance component as a neat oil or other non-encapsulated compound, in one or more embodiments, the first fragrance component includes an additional encapsulated fragrance component. In particular, the first fragrance component can include an additional encapsulated fragrance component having a fragrance encapsulated within an additional plurality of encapsulants. The additional encapsulated fragrance component can be configured to delay a release of its respective fragrance.

In some embodiments, the encapsulated fragrance component 212 (or the first fragrance component, when including an additional encapsulated fragrance component) is configured with a porosity characteristic. In other words, the encapsulated fragrance component 212 can be configured for time-based activation so that the plurality encapsulants release the fragrance over time without any other trigger causing release of the fragrance. For example, in some embodiments, the plurality of encapsulants are highly porous so that large amounts of the fragrance are released over a short period of time (e.g., the plurality of encapsulants release the fragrance relatively quickly). In other embodiments, the plurality of encapsulants are not highly porous so that a small amount of fragrance is released over a short period of time (e.g., the plurality of encapsulants release the fragrance relatively slowly). In some implementations, the encapsulated fragrance component 212 is configured for time-based activation and activation in response to another trigger. Thus, for example, the plurality of encapsulants can be configured to release fragrance over time and then, in response to a physical interaction applied to the thermoplastic bag 200, release the remainder of the fragrance. In some embodiments, the plurality of encapsulants are impermeable (i.e., non-porous) so that the plurality of encapsulants maintain all of the encapsulated fragrance until otherwise activated.

As mentioned above, in one or more embodiments, the encapsulated fragrance component is configured to delay a release of a fragrance. For example, the plurality of encapsulants of the encapsulated fragrance component can be configured to retain the fragrance until activated to release the fragrance in response to a physical interaction applied to the thermoplastic film or bag upon which the encapsulated fragrance component is disposed. FIGS. 3A-3D illustrate activation of the encapsulated fragrance component (i.e., activation of the plurality of encapsulants) in response to a physical interaction in accordance with one or more embodiments. While FIGS. 3A-3D illustrate activation of the encapsulated fragrance component in the context of thermoplastic bags, it will be appreciated that activation of the encapsulated fragrance component can operate similarly with respect to thermoplastic films in general, including other products made from or with thermoplastic films.

Figure 3A:
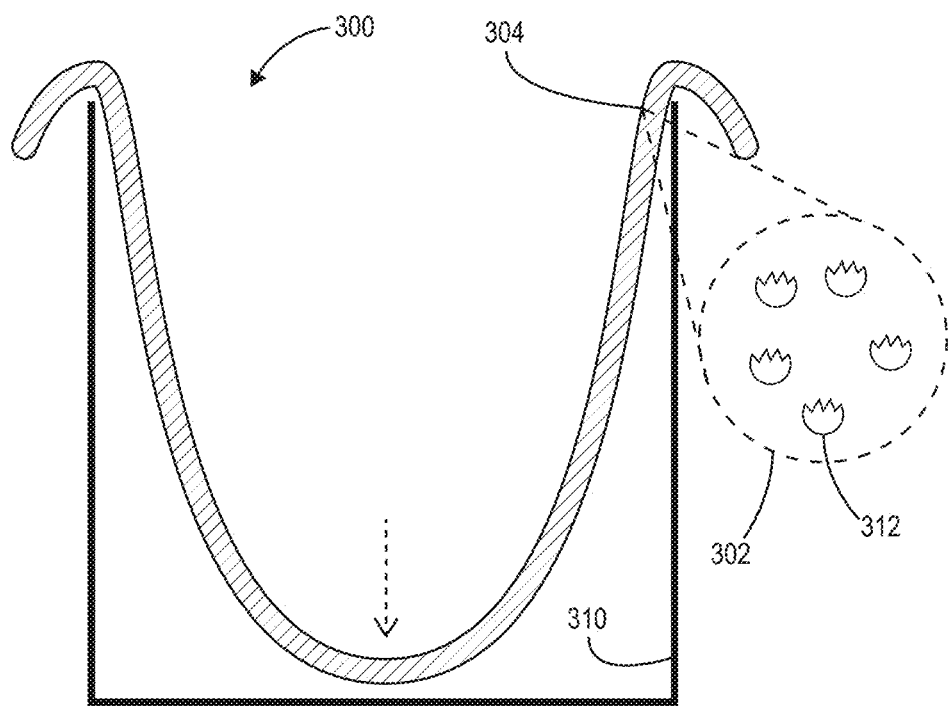
FIGS. 3A-3D illustrate activation of an encapsulated fragrance component disposed on a thermoplastic bag in response to a physical interaction in accordance with one or more embodiments.

FIG. 3A illustrates a thermoplastic bag 300 having an encapsulated fragrance component. For example, FIG. 3A illustrates a portion of the encapsulated fragrance component 302 disposed on a segment 304 of the thermoplastic bag 300 (e.g., the segment 304 including a portion of an inner surface of the thermoplastic bag 300). As discussed above with reference to FIG. 2, the portion of the encapsulated fragrance component 302 initially includes a plurality of encapsulants encapsulating a fragrance.

In particular, FIG. 3A illustrates a scenario in which the thermoplastic bag 300 is placed within a trash receptacle 310. As the thermoplastic bag 300 is placed in the trash receptacle 310, the segment 304 of the thermoplastic bag 300 may be strained (e.g., to fit the opening of the thermoplastic bag 300 around the edges of the trash receptacle 310). As shown in FIG. 3A, in response to the strain, the encapsulants from the portion of the encapsulated fragrance component 302 (e.g., the encapsulant 312) can activate to release the fragrance. As will be discussed in more detail below, in some implementations, one or more encapsulants from the portion of the encapsulated fragrance component 302 can remain unactivated, retaining the fragrance.

Figure 3B:
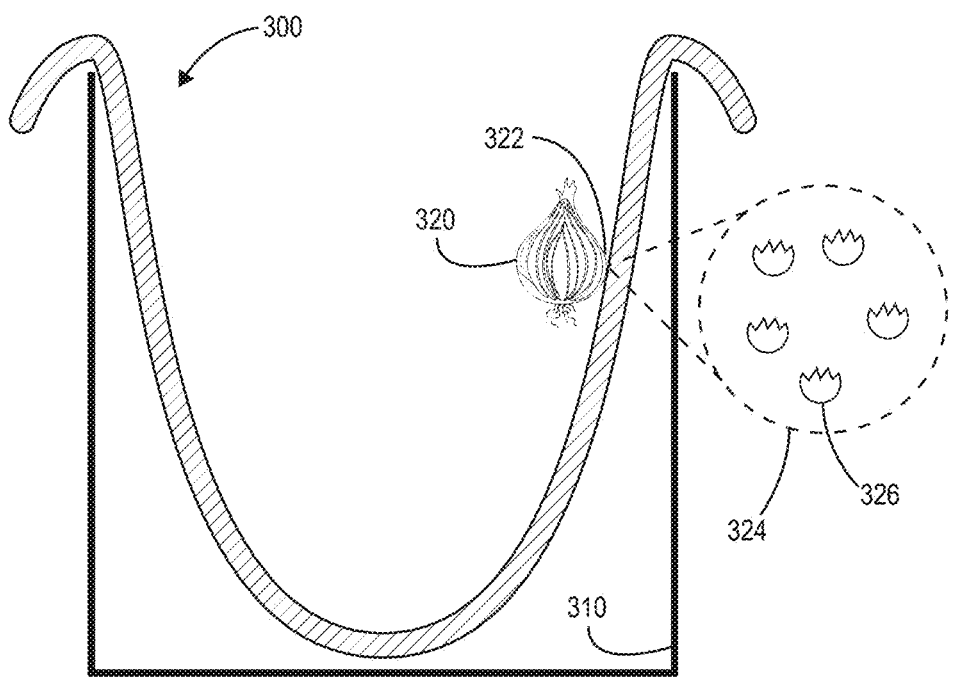

FIG. 3B illustrates the thermoplastic bag 300 within the trash receptacle 310. In particular, FIG. 3B illustrates the thermoplastic bag 300 as an object 320 (e.g., an article of trash) is placed inside. As shown in FIG. 3B, the object 320 contacts (e.g., bumps, rubs against, or otherwise touches) the segment 322 of the thermoplastic bag 300 as it is placed inside.

In response to the contact with the segment 322 of the thermoplastic bag 300 by the object 320, encapsulants (e.g., the encapsulant 326) from the portion of the encapsulated fragrance control component 324 disposed on the segment 322 can activate to release the fragrance. In particular, by contacting the segment 322 of the thermoplastic bag 300, the object 320 can apply a friction or other force to the segment 322, which causes the encapsulants to activate.

Indeed, in one or more embodiments, a friction is sufficient to activate encapsulants to release the fragrance. For example, as mentioned above, in one or more embodiments, the encapsulants of the encapsulated fragrance component are brittle when dried. Accordingly, the encapsulants are configured to activate (e.g., break) to release the fragrance when a friction is applied (e.g., via an object contacting a segment of a thermoplastic bag upon which the encapsulants are disposed).

Figure 3C:
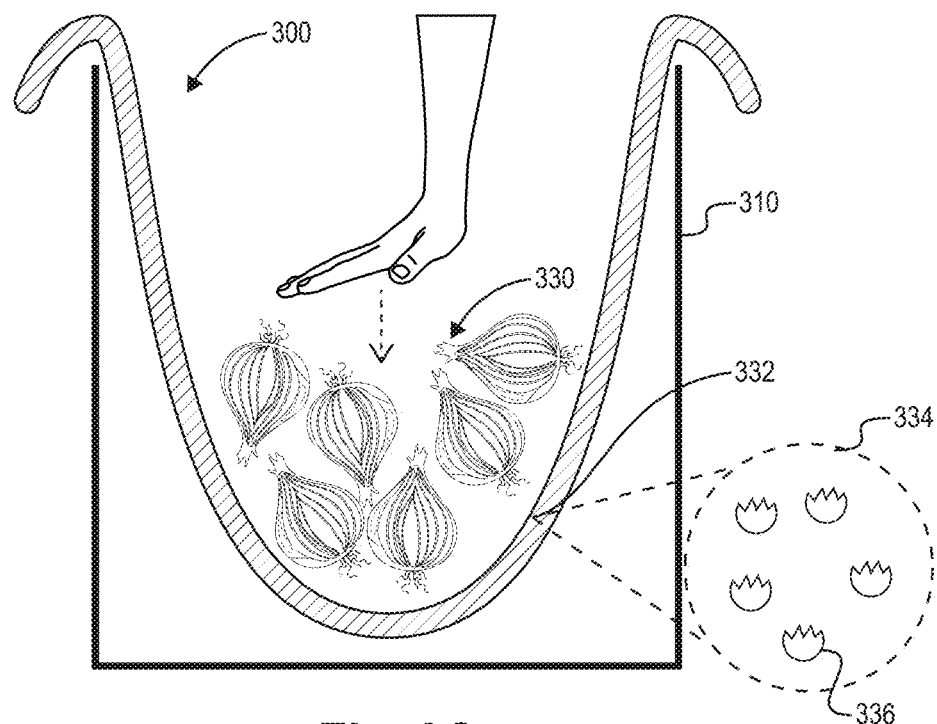

FIG. 3C also illustrates the thermoplastic bag 300 in the trash receptacle 310. In particular, FIG. 3C illustrates the thermoplastic bag 300 as a plurality of objects 330 (e.g., trash) within the thermoplastic bag 300 are pushed downward, such as when a user pushes down to make more room in the thermoplastic bag 300. As the plurality of objects 330 is pushed down, the segment 332 of the thermoplastic bag 300 may be strained. In response to the strain applied to the segment 332 of the thermoplastic bag 300, encapsulants (e.g., the encapsulant 336) from the portion of the encapsulated fragrance component 334 disposed on the segment 332 can activate to release the fragrance.

In addition to activating in response to the strain placed on the segment 332 of the thermoplastic bag 300, encapsulants disposed thereon can further activate in response to a friction applied to the segment 332 due to the downward force applied to the plurality of objects 330. In particular, while being pushed downward, the plurality of objects 330 can contact (e.g., rub or slide against) the segment 332 of the thermoplastic bag 300, causing a friction to be applied to the segment 332. Accordingly, encapsulants from the portion of the encapsulated fragrance component 334 disposed on the segment 332 can activate to release the fragrance.

Figure 3D:
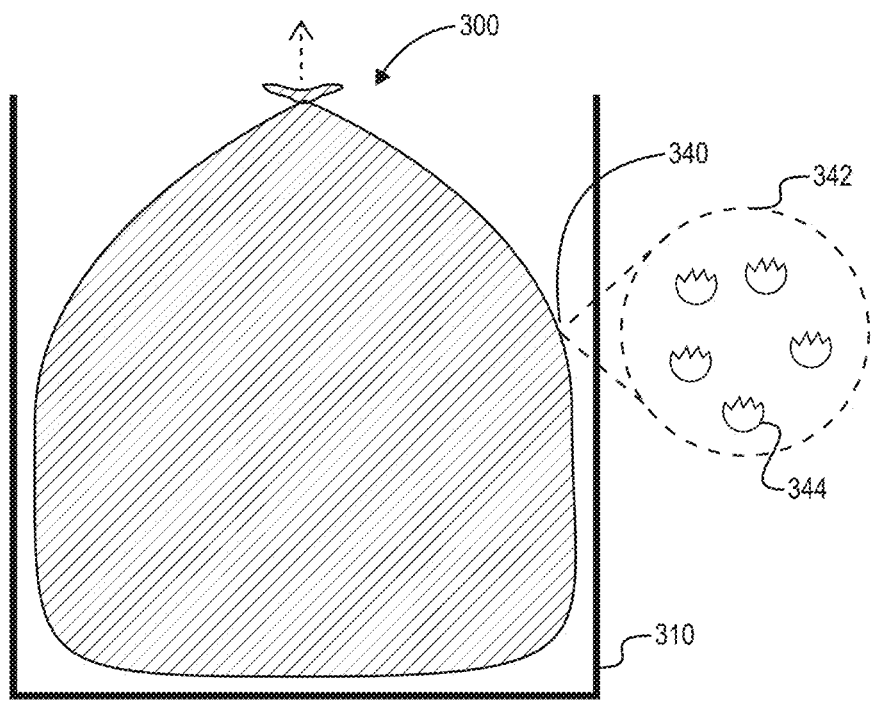

FIG. 3D also illustrates the thermoplastic bag 300 in the trash receptacle 310. In particular, FIG. 3D illustrates the thermoplastic bag 300 being lifted out of the trash receptacle 310 for disposal (e.g., when the thermoplastic bag 300 is full and ready to be replaced). As the thermoplastic bag 300 is lifted out of the trash receptacle 310, the segment 340 of the thermoplastic bag 300 may be strained. In response to the strain applied to the segment 340 of the thermoplastic bag 300, encapsulants (e.g., the encapsulant 344) from the portion of the encapsulated fragrance component 342 disposed on the segment 340 can activate to release the fragrance.

In addition to activating in response to the strain placed on the segment 340 of the thermoplastic bag 300, encapsulants disposed thereon can further activate in response to a friction applied to the segment 340 due to being lifted out of the trash receptacle 310. In particular, while the thermoplastic bag 300 is lifted out of the trash receptacle 310, the segment 340 of the thermoplastic bag 300 can rub against the trash receptacle 310 or trash within the thermoplastic bag 300, causing a friction to be applied to the segment 340. Accordingly, encapsulants from the portion of the encapsulated fragrance component 342 disposed on the segment 340 can activate to release the fragrance.

Though FIGS. 3A-3D illustrates specific physical interactions that cause encapsulants disposed on a thermoplastic bag to activate to release a fragrance, it will be appreciated that the encapsulants can activate in response to various additional physical interactions. For example, in some implementations, the thermoplastic bag 300 is configured so that encapsulants disposed thereon activate in response to opening the bag for use (e.g., placement within the trash receptacle 310) or closing the bag for replacement. To illustrate, in some implementations, a portion of the encapsulated fragrance component can be disposed on various creases that result from folding the thermoplastic bag 300 to place in a packaging. Accordingly, in response to a strain or other physical interaction that is applied as the thermoplastic bag 300 is unfolded, at least some of the encapsulants of the portion of the encapsulated fragrance component can activate to release the fragrance.

Further, FIGS. 3A-3D illustrate one instance in which encapsulants disposed on a segment of the thermoplastic bag 300 activate to release the fragrance. It will be appreciated however, that the thermoplastic bag 300 can be configured so that encapsulants disposed on a given segment activate in multiple instances (e.g., a first set of the encapsulants activate at a first time and a second set of the encapsulants activate at a second time). Indeed, in one or more embodiments, the thermoplastic bag 300 is configured so that encapsulants disposed on a given segment can be activated at various points throughout the use of the thermoplastic bag 300. In some implementations, however (e.g., as illustrated in FIGS. 3A-3D), the thermoplastic bag 300 is configured to cause the encapsulants disposed on various segments to activate at various points throughout the use of the thermoplastic bag 300. Thus, the thermoplastic bag 300 can be configured to cause at least some encapsulants disposed on some segment to activate throughout the use of the thermoplastic bag 300, enabling the thermoplastic bag 300 to provide improved (e.g., longer-lasting) odor control.

Though not illustrated in FIGS. 3A-3D, the thermoplastic bag 300 further includes a first fragrance component disposed thereon. Thus, the thermoplastic bag 300 provides dual fragrance odor control. As mentioned above, the first fragrance component can include a neat oil or other non-encapsulated compound, allowing the encapsulated fragrance component to provide additional odor control as the strength of the first fragrance component weakens. Where the encapsulated fragrance component activates before the first fragrance component is depleted, the scents of the two associated fragrances can mix, creating a new scent until depletion of the first fragrance component.

In some embodiments, however, the first fragrance component includes an additional encapsulated fragrance component. Accordingly, the encapsulated fragrance component and the additional encapsulated fragrance component can operate in conjunction to provide odor control in response to different activation triggers (e.g., in response to physical interactions with different segments of the thermoplastic bag 300).

Configuring the encapsulants of an encapsulated fragrance component to release the fragrance in response to a physical interaction applied to a thermoplastic film enables disposition of the encapsulated fragrance component onto thermoplastic films in a variety of ways (in addition to the strip discussed above with reference to FIG. 2). FIGS. 4-6B illustrate example dispositions of the encapsulated fragrance component in accordance with one or more embodiments. As with FIGS. 3A-3D, FIGS. 4-6B illustrate the disposition of the encapsulated fragrance component onto a thermoplastic bag, though the encapsulated fragrance component can be similarly disposed on a thermoplastic film or other products made from or with thermoplastic films.

Figure 4:
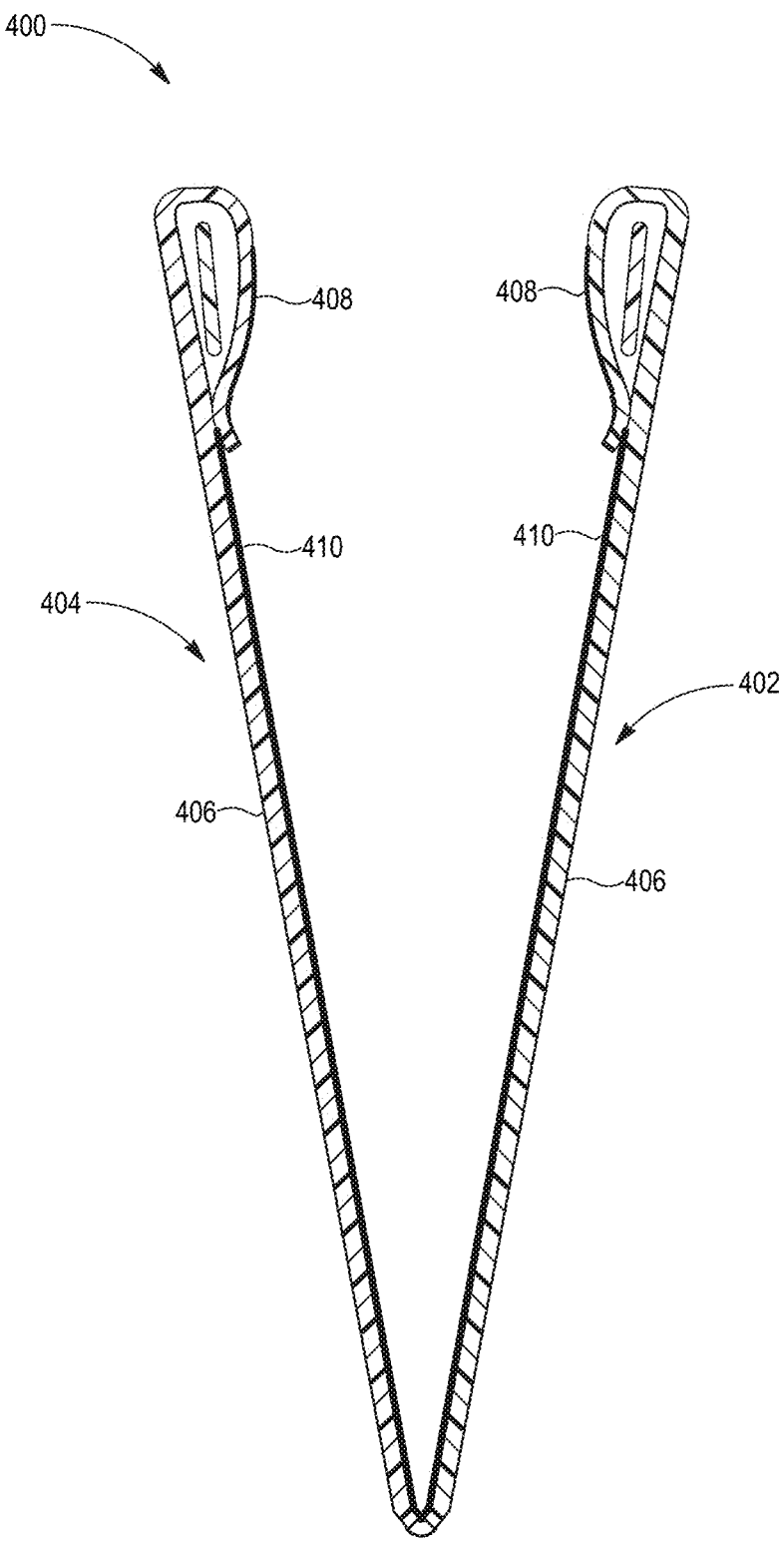
FIG. 4 illustrates a side cross-sectional view of a thermoplastic bag having dual fragrance odor control in accordance with one or more embodiments.

FIG. 4 illustrates a side cross-sectional view of a thermoplastic bag 400 having a first fragrance component and an encapsulated fragrance component disposed thereon in accordance with one or more embodiments. As shown in FIG. 4, each of the first sidewall 402 and the second sidewall 404 of the thermoplastic bag 400 includes a single layer of thermoplastic film 406. The thermoplastic film 406 of the first sidewall 402 and the second sidewall 404 can include any of the thermoplastic films described above. In one or more embodiments, each of the first and second sidewalls 402, 404 of the thermoplastic bag 400 include multiple layers of thermoplastic film as will be discussed in more detail with reference to FIGS. 6A-6B.

Additionally, as shown in FIG. 4, the thermoplastic bag 400 includes the first fragrance component 408 disposed to cover an interior surface of the hems of the bag 400 and the encapsulated fragrance component 410 disposed to cover an interior surface of the first and second sidewalls 402, 404. In one or more embodiments, however, the first fragrance component 408 and/or the encapsulated fragrance component 410 are disposed on an exterior surface of the respective sidewall. Further, some embodiments involve coextruding the first fragrance component 408 with the first and second sidewalls 402, 404 and/or the encapsulated fragrance component 410 with the first and second sidewalls 402, 404 (i.e., embedding the first fragrance component 408 and/or the encapsulated fragrance component 410 into the thermoplastic film forming the first sidewall 402 and the second sidewall 404 during the extrusion process) as discussed above. By disposing the first fragrance component 408 and the encapsulated fragrance component 410 to cover the entire available interior surface, the thermoplastic bag 400 supplies a more even distribution of the first fragrance component and the encapsulated fragrance component, providing a more prominent odor control. In some implementations, covering the entire available surface allows for a greater amount of the encapsulated fragrance component to be applied to the thermoplastic bag 400.

In some implementations, the first fragrance component 408 and/or the encapsulated fragrance component 410 are disposed to cover less than the entire interior surface (or exterior surface) of the respective sidewall as suggested above with reference to FIG. 2. In the embodiment of FIG. 4, the first fragrance component 408 is disposed near the opening of the bag 400 such that the user will notice the first fragrance when initially opening the bag 400. The encapsulated fragrance component 410 is disposed along the interior of the sidewalls of the bag such that the encapsulated fragrance component 410 will be activated upon trash entering and interacting with the interior sidewalls of the bag 400.

Further, though FIG. 4 illustrates the thermoplastic bag 400 having the first fragrance component 408 and the encapsulated fragrance component 410 disposed on the sidewalls, the thermoplastic bag 400 can have the first fragrance component 408 and/or the encapsulated fragrance component 410 applied in various other ways. For example, in some implementations, the thermoplastic bag 400 has the first fragrance component 408 applied to an upper portion of the thermoplastic bag 400 (e.g., on an upper portion of one or both of the first and second sidewalls 402, 404). Further, the thermoplastic bag 400 has the encapsulated fragrance component 410 applied to a lower portion of the thermoplastic bag 400 (e.g., on a lower portion of one or both of the first and second sidewalls 402, 404).

Figure 5:
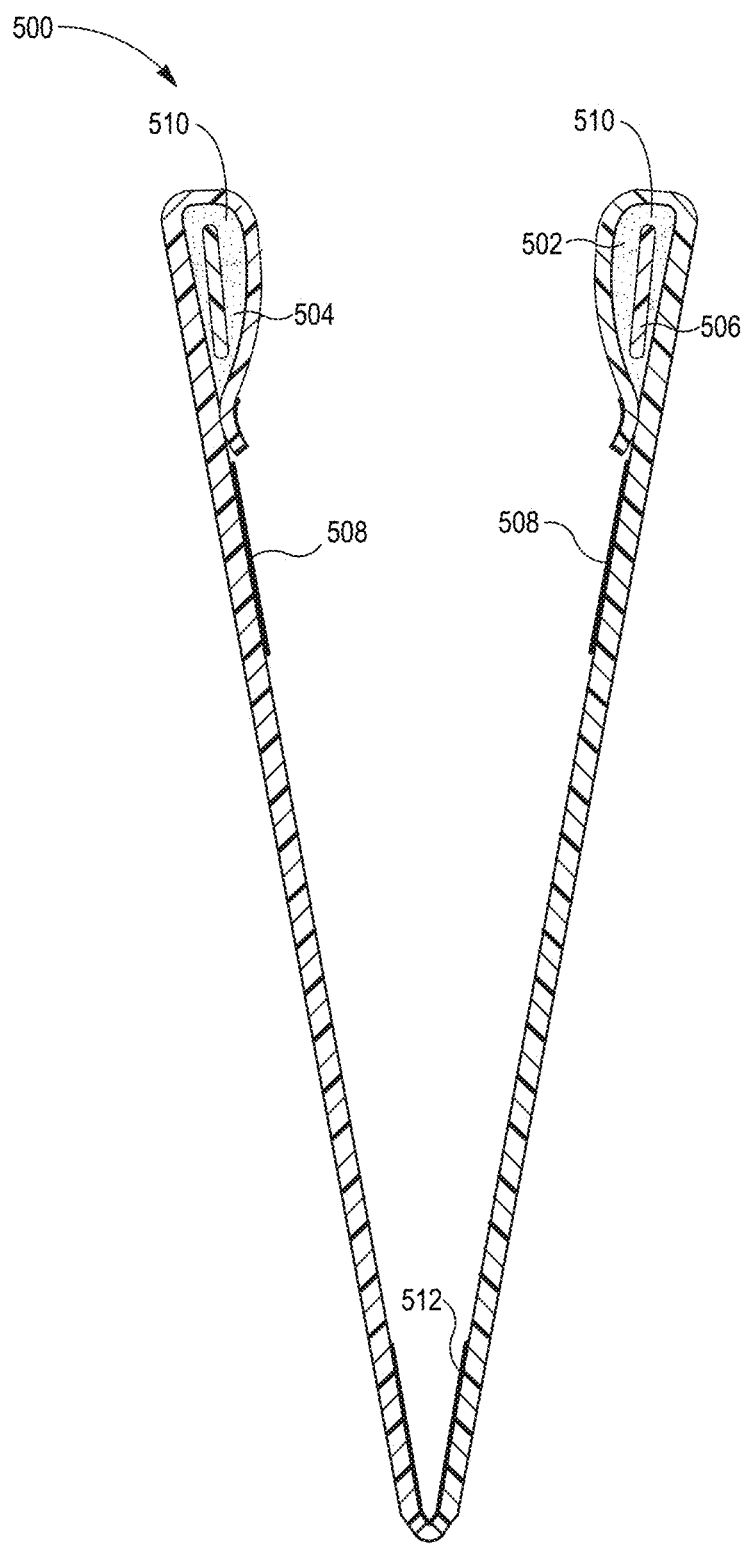
FIG. 5 illustrates side cross-sectional view of another thermoplastic bag having dual fragrance odor control in accordance with one or more embodiments.

FIG. 5 illustrates a side cross-sectional view of a thermoplastic bag 500 having a first fragrance component and an encapsulated fragrance component disposed thereon in accordance with one or more embodiments. As shown in FIG. 5, the thermoplastic bag 500 includes the first fragrance component 508 disposed just below a first hem 502 and a second hem 504 and the encapsulated fragrance component 510 disposed within the first and second hems 502, 504 of the thermoplastic bag 500. In one or more embodiments, the first hem 502 and/or the second hem 504 are configured to be impermeable. Alternatively, the encapsulated fragrance component 510 can exit through the draw tape hole(s) in the hems 502, 504.

By disposing the encapsulated fragrance component 510 within the first hem 502 and the second hem 504, the thermoplastic bag 500 can include fragrance components that are not consumer friendly (e.g., not visually attractive, sticky, oily, powder, etc.) as will be discussed in more detail with regards to FIGS. 6A-6B. In particular, positioning the first fragrance component or the encapsulated fragrance component within the hems can help ensure that a user does not come into direct contact with the first fragrance component or the encapsulated fragrance component.

Further, by disposing the encapsulated fragrance component 510, the thermoplastic bag 500 can be configured to cause the encapsulants to activate to release the encapsulated fragrance in response to various physical interactions. For example, as shown in FIG. 5, the thermoplastic bag 500 includes a drawstring 506 positioned within the first hem 502 and the second hem 504. Accordingly, the encapsulants of the encapsulated fragrance component 510 can be configured to delay a release of the fragrance until activated by a physical interaction with the drawstring 506. For example, when the drawstring 506 moves through the hems 502, 504, the drawstring 506 can cause a friction within the hems 502, 504. In response to the friction, the encapsulants of the encapsulated fragrance component 510 can activate to release the fragrance.

Additionally, while many of the embodiments described herein include a first non-encapsulated fragrance and a second encapsulated fragrance, the present invention is not so limited. Indeed, one or more embodiments include more than two different fragrance components that are each configured to provide fragrance at different times or in response to different triggers or activations. For example, FIG. 5 illustrates that the thermoplastic bag 500 can include an additional encapsulated fragrance component 512 positioned at the bottom of the bag. As noted above, the first fragrance component 508 can provide fragrance/odor abatement when the thermoplastic bag 500 is opened, the encapsulated fragrance component 510 can provide fragrance/odor when activated in response to pulling on the drawstring (i.e., during removal and disposal of the thermoplastic bag 200), the additional encapsulated fragrance component 512 can provide fragrance/odor when activated in response to trash being placed in the thermoplastic bag 500.

Additionally, each of the fragrance components (508, 510, 512) can combine to provide a changing fragrance experience. For example, the first fragrance component 508 can comprise a lemon neat oil, the encapsulated fragrance component 510 can comprises a mint sheer-encapsulated fragrance, and the additional encapsulated fragrance component 512 can comprise a *eucalyptus* water-triggered encapsulated fragrance. Thus, each of the fragrance components (508, 510, 512) can provide a different scent in response to a different action (opening of the bag, sheer force due to activation of the drawstring, water entering the bottom of the bag in connection with trash being placed in the bag).

Figures 6A, 6B:
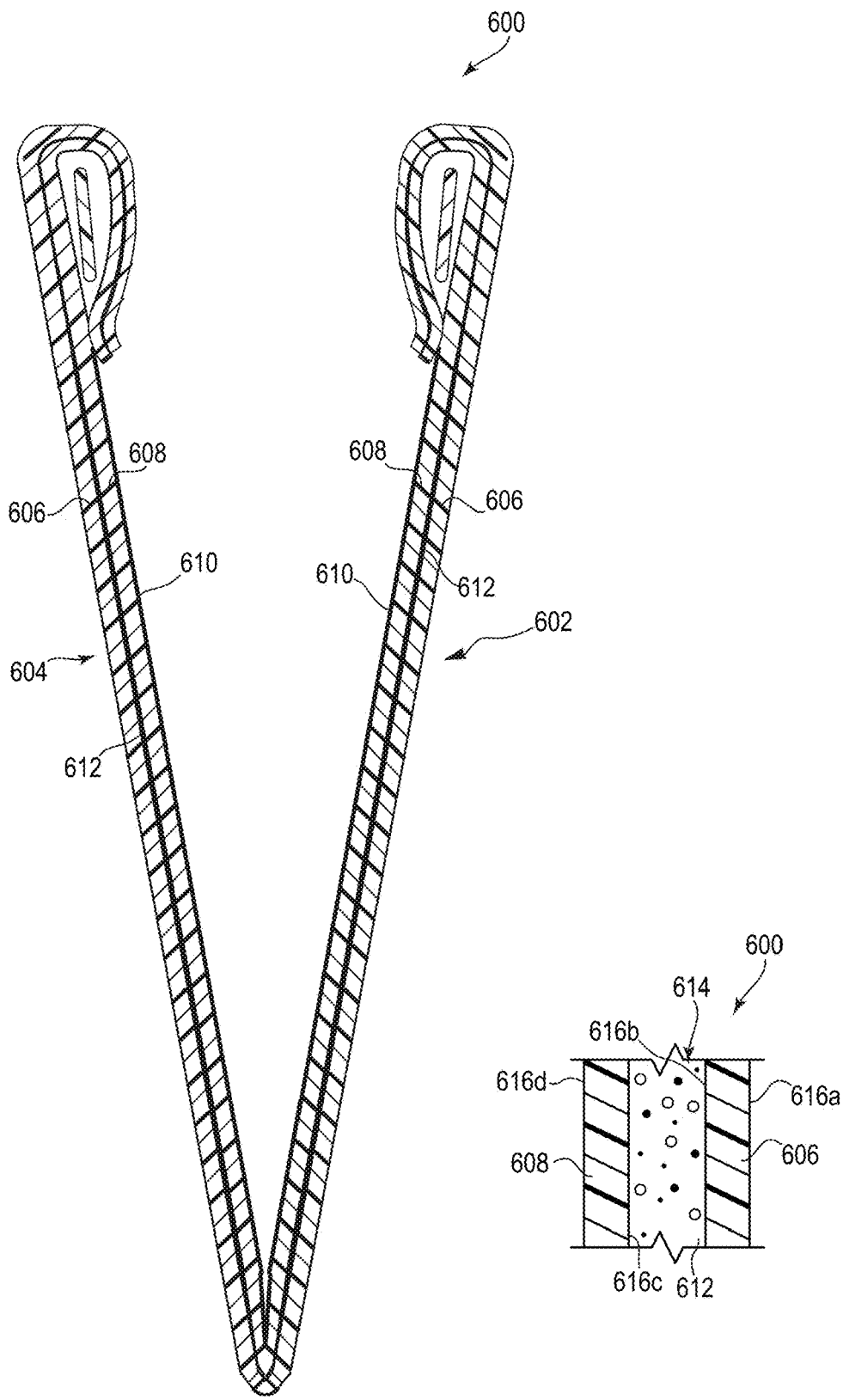
FIG. 6A illustrates a side cross-sectional view of yet another thermoplastic bag having dual fragrance odor control in accordance with one or more embodiments.
FIG. 6B illustrates an enlarged partial side cross-sectional view of a sidewall of the thermoplastic bag of FIG. 6A.

FIG. 6A is a side cross-sectional view of a thermoplastic bag 600. FIG. 6B is an enlarged view of the side cross-sectional view of the thermoplastic bag 600 of FIG. 6A. Referring to FIGS. 6A and 6B together, each of the first and second sidewalls 602, 604 of the thermoplastic bag 600 includes multiple layers of thermoplastic film. In particular, each of the first and second sidewalls 602, 604 includes a first film 606 and a second film 608. The thermoplastic bag 600 further comprises a first fragrance component 610 disposed on one or more of the second, interior films 608 and an encapsulated fragrance component 612 disposed between the first and second films 606, 608. When disposed within a receptacle (e.g., trash can), the first film 606 of each of the first and second sidewalls 602, 604 (referred to herein collectively as "the first film 606") of the thermoplastic bag 600 may face (e.g., be oriented adjacent and proximate to) the receptacle, and the second film 608 of each of the first and second sidewalls 602, 604 (referred to herein collectively as "the second film 608") may face (e.g., at least partially define) the interior of the of the thermoplastic bag 600.

The first and second films 606, 608 may include films such as any of the films described above. As mentioned briefly above, the first fragrance component 610 and the encapsulated fragrance component 612 may be disposed on one or more of the first film 606 and the second film 608 of their respective sidewall. Specifically, the first and second films 606, 608 may be partially dosed with the first fragrance component 610 and partially dosed with the encapsulated fragrance component 612. As shown, encapsulated fragrance component 612 is disposed between the first and second films 606, 608. As used herein, the term "between," when referring to the encapsulated fragrance component 612, and the first and second films 606, 608, means that the encapsulated fragrance component 612 is disposed at least partially within a space separating at least a portion of the first film 606 and at least a portion of the second film 608. Thus, the encapsulated fragrance component 612 can be disposed on one or more of the first and second films 606, 608 (e.g., on a side of the first and second films 606, 608 facing the space separating the first and second films 606, 608 from each other). Furthermore, the encapsulated fragrance component 612 can be disposed at least partially in (e.g., at least partially embedded in) one or more of the first and second films 606, 608.

In some embodiments, the first fragrance component 610 and/or the encapsulated fragrance component 612 can at least substantially fully span an area between the first film 606 and the second film 608. In other words, the first fragrance component 610 and/or the encapsulated fragrance component 612 can at least substantially fully span a length and width of the first and second films 606, 608. In other embodiments, the first fragrance component 610 and/or the encapsulated fragrance component 612 may be disposed along only portions of the first and second films 606, 608. In other words, the first fragrance component 610 and/or the encapsulated fragrance component 612 may not be continuous and may span only portions of the area between the first film 606 and the second film 608. In additional embodiments, the first fragrance component 610 or the encapsulated fragrance component 612 is included in the first and second films 606, 608 (via inclusion in master batch used to form the first and second films 606, 608) in addition to being disposed between the first and second films 606, 608.

In some embodiments, the first and second sidewalls 602, 604 include an air gap 614 between the first and second films 606, 608 that works in conjunction with the encapsulated fragrance component 612. In one or more embodiments, the air gap 614 provides a means of trapping malodor. For example, malodor can pass into the air gap 614 and be at least partially trapped within the air gap 614. Thus, the air gap 614 can reduce or prevent malodor from passing through the outer film (i.e., the first film 606) of the thermoplastic bag 600. Additionally, one or more embodiments include the encapsulated fragrance component 612 within the air gap 614. Having the encapsulated fragrance component 612 within the air gap 614 can allow for a further delay in odor control as the fragrance would have to first penetrate the inner film (i.e., the second film 608). Furthermore, one or more embodiments involve using the air gap 614 to alter the pH of odoriferous species and mitigate formation of odor causing agents. In some implementations, such as when the encapsulated fragrance component 612 is moisture activated, moisture (e.g., water vapor particles) can pass into the air gap 614 to activate the encapsulated fragrance component 612.

The air gap 614 can provide an area for disposition of the encapsulated fragrance component 612 that conceals the encapsulated fragrance component 612. Thus, one or more embodiments includes an encapsulated fragrance component that is unsuitable for use in an unconcealed portion of a bag. For example, the encapsulated fragrance component 612 between the first and second films 606, 608 can comprise a fragrance component that lacks aesthetically pleasing characteristics generally desired by consumers. In another embodiment, the encapsulated fragrance component 612 comprises negative effects to a consumer, such as skin irritation issues, dust inhalation issues, or other negative effects when combined with consumer interaction. In another embodiment, the encapsulated fragrance component 612 is disposed in a wet (i.e., liquid) application that can have a negative effect for users of the bag. The air gap 614 can prevent a user from touching or accessing such wet fragrance components.

Additionally, the ability to place fragrance components in between layers is helpful in preserving synergy. For example, the ability to place a first fragrance component and/or an encapsulated fragrance component in the air gap 614 between the first and second films 606, 608 can facilitate higher levels of fragrance component dosing without exposing a user to an oily (or other undesirable) feel inside the bag.

Furthermore, in some embodiments, the location where the first fragrance component 610 and/or the encapsulated fragrance component 612 is disposed may be selected based on where the malodor particles will be located relative to the thermoplastic bag 600. For example, the first fragrance component 610 and/or the encapsulated fragrance component 612 may be disposed on the first film 606 and the second film 608 at the bottom area of the thermoplastic bag 600 (e.g., a portion of the bag most likely to be exposed to malodor molecules). Furthermore, in some embodiments, the one or more substances of the first fragrance component 610 and/or the encapsulated fragrance component 612 may be selected based on where the first fragrance component 610 and/or the encapsulated fragrance component 612 will be located relative to the thermoplastic bag 600.

As shown in FIGS. 6A and 6B, the inner surface 616d of the thermoplastic bag 600 can have a first surface area. In some embodiments, the inner surface 616d is the only surface upon which first fragrance component is applied.

One will appreciate in light of the disclosure herein that the thermoplastic bag 600 includes additional surfaces 616b and 616c (i.e., the surfaces of the first and second films 606, 608 facing each other and forming the air gap 614). Thus, in one or more embodiments, the thermoplastic bag 600 can have the first fragrance component 610 and/or the encapsulated fragrance component 612 applied to a total surface area that is greater than the surface area of the inside layer of the thermoplastic bag 600 (i.e., by applying the first fragrance component 610 and/or the encapsulated fragrance component 612 to surfaces 616a, 616b, and/or 616c).

In one or more embodiments, the encapsulated fragrance component 612 may comprise a bonding layer. In other words, the encapsulated fragrance component 612 may at least partially bond the first film 606 to the second film 608. For example, the encapsulated fragrance component 612 or a carrier for the encapsulated fragrance component 612 may include one or more of an adhesive, glue, tackifier, tapes, or any other known material for bonding films together.

Though not specifically shown in FIGS. 6A-6B in one or more embodiments, the encapsulated fragrance component 612 is disposed between layers of thermoplastic film of the thermoplastic bag 600 (e.g., between the first and second films 606, 608) in particular locations. For example, in some implementations, the encapsulated fragrance component 612 is disposed between layers of thermoplastic film in one or more of the hems of the thermoplastic bag 600. Accordingly, the thermoplastic bag 600 can provide additional odor control near the top of the thermoplastic bag 600, such as when the thermoplastic bag 600 is stretched at the top for placement in a trash receptacle or when the thermoplastic bag 600 is closed for disposal.

While the above discusses thermoplastic films and bags having a first fragrance component and a second, encapsulated fragrance component disposed thereon, thermoplastic films and bags can have one or more additional fragrance components disposed thereon in some implementations. For example, in some embodiments, a thermoplastic film or bag includes a third fragrance component—an additional encapsulated fragrance component—disposed thereon. The additional encapsulated fragrance component can include an additional plurality of encapsulants encapsulating a fragrance. The fragrance of the additional encapsulated fragrance component can include the same scent, a different but related scent, or a different and unrelated scent compared to the scent of the first fragrance component and/or the encapsulated fragrance component. In implementations where the fragrance of the additional encapsulated fragrance component includes a different scent as the scent of the first fragrance component and/or the encapsulated fragrance component, the thermoplastic film or bag provides a multi-scent experience where the scent provided by the thermoplastic film or bag changes over time and/or as a user interacts with the thermoplastic film or bag.

In some implementations, the thermoplastic film or bag includes, in addition to a first fragrance component and an encapsulated fragrance component, one or more other form of encapsulated odor control component. As used herein, the terms "encapsulated odor control component" and "odor control component" refer to a structure or compound that includes one or more encapsulants and an odor-control active encapsulated within the one or more encapsulants. As used herein, the term "odor-control active" refers to a composition that effects (e.g., changes and/or masks) odors in at least one manner. For example, the odor-control active can absorb (e.g., foul smell odors), adsorb, and/or may include fragrance materials. Furthermore, the odor-control active can mask (e.g., cover up) and/or neutralize malodors. In other words, the term "odor-control active" can refer to a broader category of compositions that can be used for odor control, which includes fragrances. As used herein the term "neutralize" or any of its derivative terms refers to an ability of a compound or product to reduce or eliminate malodorous compounds. Odor neutralization may be partial, affecting only some of the malodorous compounds in a given context, or affecting only a portion of a malodorous compound. A malodorous compound may be neutralized by chemical reaction resulting in a new chemical entity, by sequestration, by chelation, by association, or by any other interaction rendering the malodorous compound less malodourous or non-malodorous. For example, in some embodiments, the odor-control active includes oxidizing chemistries (e.g., peroxides, hypochlorous acid, chlorine, ozone, sodium perborate, etc.). In some embodiments, the odor-control active comprises antimicrobial agents. For example, the odor-control active can include zinc pyrithione ("ZPT") and/or copper pyrithione ("CPT")). In some embodiments, the odor-control active comprises vapor phase antimicrobials. For example, the odor-control active can comprise essential oils (e.g., thymol, lemongrass, tea tree, etc.), chlorine dioxide and/or ethylene oxide. Moreover, the odor-control active can include one or more of desiccant materials (e.g., a hygroscopic substance, such as calcium oxide or silica gel, that has a high affinity for water and is used as a drying agent), deodorizing agents (i.e., deodorizing compositions with a deodorizing effect on offensive odors such as that associated with activated nitrogen compound, activated sulfur compounds, etc.), and functional nanoparticles. In yet further embodiments, the odor-control active can include a trapping or an adsorbent/absorbent agent (e.g., zeolites, activated carbon, etc.).

In one or more embodiments, the additional encapsulated fragrance component(s) or the encapsulated odor control component(s) is configured to activate in response to a different activation trigger than the encapsulated fragrance component (e.g., so they don't release their respective fragrances or odor-control actives at the same time). For example, an additional encapsulated fragrance component or an encapsulated odor control component can be configured to activate in response to additional physical interactions applied to the thermoplastic film or bag, such as additional strain or friction applied to the thermoplastic film or bag. In other words, the encapsulated fragrance component and the additional encapsulated fragrance component or an encapsulated odor control component can be configured with different encapsulant strengths so that they activate in phases.

In accordance with one implementation, a structural elastic-like film (SELF) process may be used to create a thermoplastic film with strainable networks. Indeed, any of the thermoplastic films or bags mentioned above can include thermoplastic film created using the SELF process. In some implementations (e.g., where the thermoplastic film includes multiple layers), the SELF process results in discontinuous bonding of adjacent layers. Indeed, the strainable networks can include adjacent bonded and un-bonded regions. U.S. Pat. Nos. 5,518,801; 6,139,185; 6,150,647; 6,394,651; 6,394,652; 6,513,975; 6,695,476; U.S. Patent Application Publication No. 2004/0134923; and U.S. Patent Application Publication No. 2006/0093766 each disclose processes for forming strainable networks or patterns of strainable networks suitable for use with implementations of the present disclosure. The contents of each of the aforementioned patents and publications are incorporated in their entirety by reference herein. As used herein, the term "strainable network" refers to an interconnected and interrelated group of regions which are able to be extended to some useful degree in a predetermined direction providing the web material with an elastic-like behavior in response to an applied and subsequently released elongation.

Figure 7:
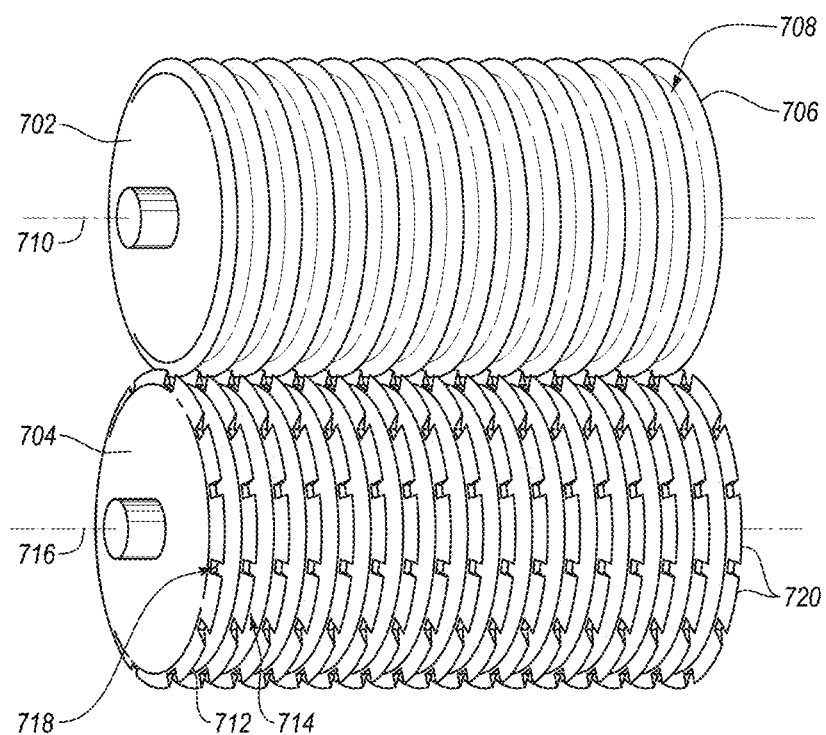
FIG. 7 illustrates a schematic diagram of a set of intermeshing rollers used to form a structural elastic like film (SELF) by imparting strainable networks into the film while lightly laminating adjacent layers of a film in accordance with one or more embodiments.

FIG. 7 illustrates a pair of SELF'ing intermeshing rollers 702, 704 for creating strainable networks in a thermoplastic film. The first SELF'ing intermeshing roller 702 can include a plurality of ridges 706 and grooves 708 extending generally radially outward in a direction orthogonal to an axis of rotation 710. The second SELF'ing intermeshing roller 704 can also include a plurality of ridges 712 and grooves 714 extending generally radially outward in a direction orthogonal to an axis of rotation 716. As shown by FIG. 7, however, the ridges 712 of the second SELF'ing intermeshing roller 704 can include a plurality of notches 718 that define a plurality of spaced teeth 720.

Figure 8A:
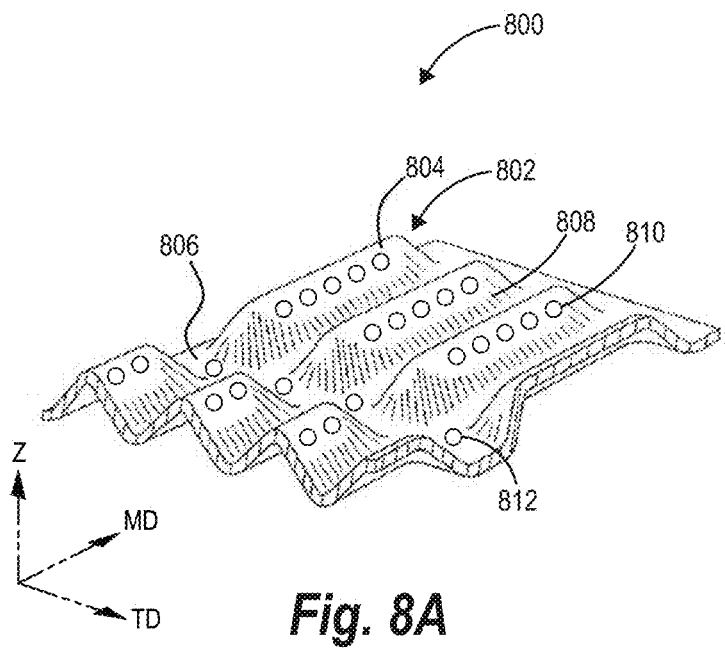
FIG. 8A illustrates a side view of a thermoplastic film created by passing a thermoplastic film through the intermeshing rollers of FIG. 7 and applying an encapsulated fragrance component thereon in accordance with one or more embodiments.

Referring now to FIG. 8A, a thermoplastic film 800 created using the SELF'ing intermeshing rollers 702, 704, is shown. In particular, as the thermoplastic film 800 passes through the SELF'ing intermeshing rollers 702, 704, the teeth 720 can press a portion of the thermoplastic film 800 out of plane to cause permanent deformation of a portion of the thermoplastic film 800 in the Z-direction. The portions of the thermoplastic film 800 that passes between the notched regions (i.e., the notches 718) of the teeth 720 will be substantially unformed in the Z-direction, resulting in a plurality of deformed, raised, rib-like elements 802. The length and width of the rib-like elements 802 depends on the length and width of teeth 720.

As shown by FIG. 8A, the strainable network of the thermoplastic film 800 can include first thicker regions 804, second thicker regions 806, and stretched, thinner transitional regions 808 connecting the first and second thicker regions 804, 806. The first thicker regions 804 and the stretched, thinner transitional regions 808 can form the raised, rib-like elements 802 of the strainable network. Further, the second thicker regions 806 can form web areas of the thermoplastic film 800. In particular, the second thicker regions 806 can form web areas that are out of plane with the raised, rib-like elements 802 so as to create recesses between adjacent rib-like elements.

As shown in FIG. 8A, the thermoplastic film 800 further includes an encapsulated fragrance component. In particular, the encapsulated fragrance component includes a fragrance (not shown) encapsulated within a plurality of encapsulants 810. As shown, the encapsulants 810 can be applied across the raised, rib-like elements 802 and the web areas corresponding to the second thicker regions 806. For example, as shown in FIG. 8A, a first set of the encapsulants 810 can be disposed on a surface of the raised, rib-like elements 802 (e.g., on the first thicker regions 804), and a second set of the encapsulants 810 can be disposed on a surface of the web areas (e.g., on the second thicker regions 806) so that at least some encapsulants from the second set of the encapsulants 810 (e.g., the encapsulant 812) are positioned within the recesses between adjacent ribs. Though FIG. 8A only shows the first set of the encapsulants 810 on the first thicker regions 804 corresponding to the raised, rib-like elements 802, encapsulants can additionally or alternatively be disposed on the stretched, thinner regions 808 in some implementations. In other words, the surface of the raised, rib-like elements 802 can include the first thicker regions 804 as well as the stretched, thinner regions 808.

In one or more embodiments, the encapsulated fragrance component is applied to the thermoplastic film 800 after the thermoplastic film 800 is passed through the SELF'ing intermeshing rollers 702, 704. In some embodiments, however, the encapsulated fragrance component is applied before the thermoplastic film 800 is passed through the SELF'ing intermeshing rollers 702, 704. In such a case, the pliability of the encapsulants 810 (e.g., before the encapsulants 810 have dried) may allow the encapsulants 810 to pass through the SELF'ing intermeshing rollers 702, 704 unbroken.

In some implementations, as mentioned above, the encapsulants 810 are configured to delay a release of the fragrance until activated (e.g., triggered). In other words, the encapsulants 810 can retain the encapsulated fragrance until activated to release the fragrance. For example, in one or more embodiments, the encapsulants 810 retain the fragrance until activated to release the fragrance in response to a physical interaction applied to the thermoplastic film 800 (e.g., applied to the raised, rib-like elements 802 corresponding to the first thicker regions 804 and the web areas corresponding to the second thicker regions 806). To illustrate, the encapsulants 810 can be configured to activate to release the fragrance in response to a physical strain applied to the thermoplastic film 800.

The rib-like elements 802 can allow the thermoplastic film 800 to undergo a substantial "geometric deformation" prior to a "molecular-level deformation." As used herein, the term "molecular-level deformation" refers to deformation, which occurs on a molecular level and is not discernible to the normal naked eye. That is, even though one may be able to discern the effect of molecular-level deformation, e.g., elongation or tearing of the film, one is not able to discern the deformation, which allows or causes it to happen. This is in contrast to the term "geometric deformation," which refers to deformations of thermoplastic films which are generally discernible to the normal naked eye when the thermoplastic films or articles embodying the thermoplastic films are subject to an applied strain. Types of geometric deformation include, but are not limited to bending, unfolding, and rotating.

Figure 8B:
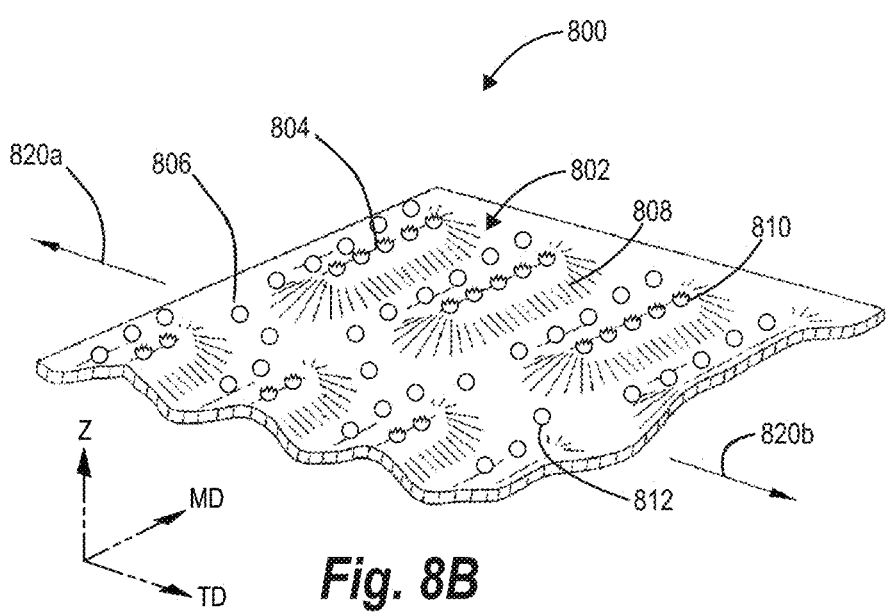
FIG. 8B illustrates a side view of the thermoplastic film of FIG. 8A having a strain applied thereto in accordance with one or more embodiments.

Thus, as shown in FIG. 8B upon application of a physical strain (e.g., in the TD direction as indicated by the arrows 820a-820b), the raised, rib-like elements 802 can undergo geometric deformation before either the raised, rib-like elements 802 or the flat regions corresponding to the web areas undergo molecular-level deformation. For example, an applied physical strain can pull the raised, rib-like elements 802 back into plane with the flat regions corresponding to the web areas prior to any molecular-level deformation of the thermoplastic film 800. Geometric deformation can result in significantly less resistive forces to an applied strain than that exhibited by molecular-level deformation.

As further shown in FIG. 8B, a portion of the encapsulants 810 can activate to release the fragrance in response to the applied physical strain. In particular, as shown in FIG. 8B, the first set of the encapsulants 810 on the surface of the raised, rib-like elements 802 (e.g., on the first thicker regions 804) have been activated while the second set of the encapsulants 810 on the surface of the web areas (e.g., on the second thicker regions 806) have not been activated in response to the applied physical strain.

Indeed, in one or more embodiments, the raised, rib-like elements 802 and the web areas are configured to cause the encapsulants 810 to activate in phases. For example, the position of the first set of the encapsulants 810 relative to the second set of the encapsulants 810 (e.g., the set of encapsulants disposed on the second thicker regions 806, including the encapsulant 812) can cause the first set of the encapsulants 810 to activate in a first phase in response to a physical strain applied to the thermoplastic film 800. Further, the relative positioning can cause the second set of the encapsulants 810 to activate in a subsequent phase in response to an additional physical strain applied to the thermoplastic film 800.

To illustrate, in one or more embodiments, as the physical strain is applied to the thermoplastic film 800 and the raised, rib-like elements 802 are pulled back into plane with the flat regions corresponding to the web areas, the surface of the raised, rib-like elements 802 flattens, stretches, or otherwise moves, causing the first set of the encapsulants 810 to activate and release the fragrance. For example, the physical strain can stretch the surface of the raised, rib-like elements 802 sufficiently to overcome the structural integrity (e.g., the tensile strength) of the first set of the encapsulants 810. In other words, in one or more embodiments, a geometric deformation of the raised, rib-like elements 802 in response to a physical strain can be sufficient to cause the first set of the encapsulants 810 to activate to release the fragrance. To further the illustration, the web areas may be unaffected by the (initial) physical strain applied to the thermoplastic film 800 (as the raised, rib-like elements 802 undergo geometric deformation before the web areas undergo deformation, as discussed above). Thus, the positioning of the second set of the encapsulants 810 on the surface of the web areas is configured to enable the second set of the encapsulants 810 to retain the fragrance until they are activated by an additional strain applied to the thermoplastic film 800 that causes the web areas to undergo some deformation.

Figure 8C:
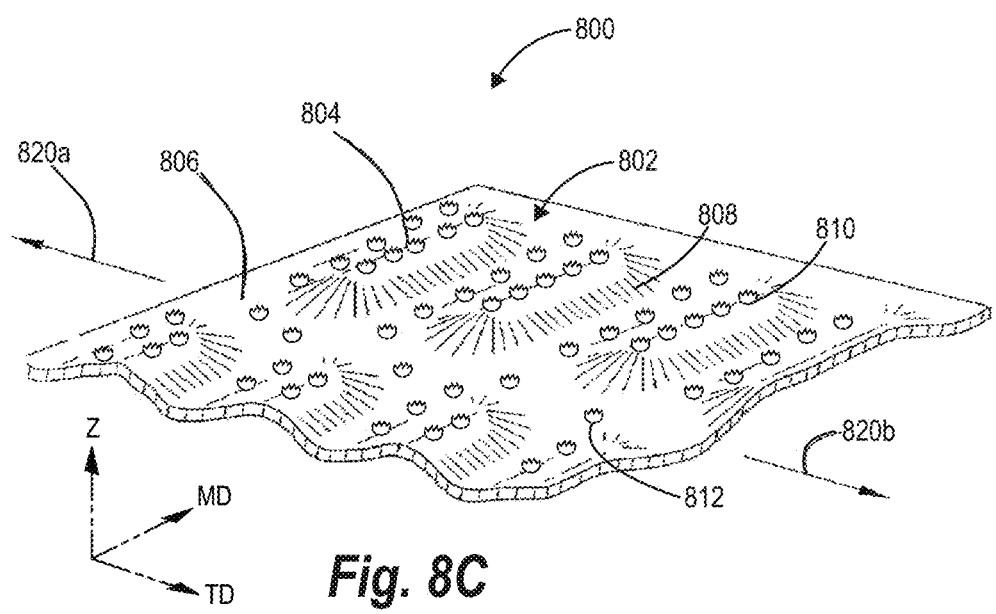
FIG. 8C illustrates a side view of the thermoplastic film of FIG. 8B having an additional strain applied thereto in accordance with one or more embodiments.

Indeed, FIG. 8C illustrates application of an additional physical strain (e.g., in the TD direction as indicated by the arrows 820a-820b) to the thermoplastic film 800. As shown in FIG. 8C, as the additional physical strain is applied to the thermoplastic film 800, the second set of the encapsulants 810 (e.g., the set of encapsulants disposed on the second thicker regions 806, including the encapsulant 812) can activate to release the fragrance. For example, as the additional physical strain is applied, the web areas can undergo some deformation, resulting in activation of the second set of the encapsulants 810.

In one or more embodiments, the encapsulants 810 are configured to activate in response to various additional or alternative physical interactions. For example, as discussed above the encapsulants 810 can be configured to activate in response to an applied friction or a pressure.

Further, though much of the present disclosure discusses the encapsulants 810 being activated by a physical interaction with the thermoplastic film 800, the encapsulants 810 can be configured to activate based on various other triggers in other implementations. For example, in some implementations, the encapsulants 810 are configured to activate the release the fragrance based on pH exposure. For example, the encapsulants 810 can be configured to activate to release the fragrance based on exposure to (e.g., contact with) malodor particles from a malodor source having a particular pH level or having a pH level within a range of pH levels. In some embodiments, the encapsulants 810 are configured to activate to release the fragrance based on exposure to water, water vapor, or some other liquid. In some embodiments, the encapsulants 810 are configured to release the fragrance over time (e.g., are configured with a porosity characteristic).

Figure 8D:
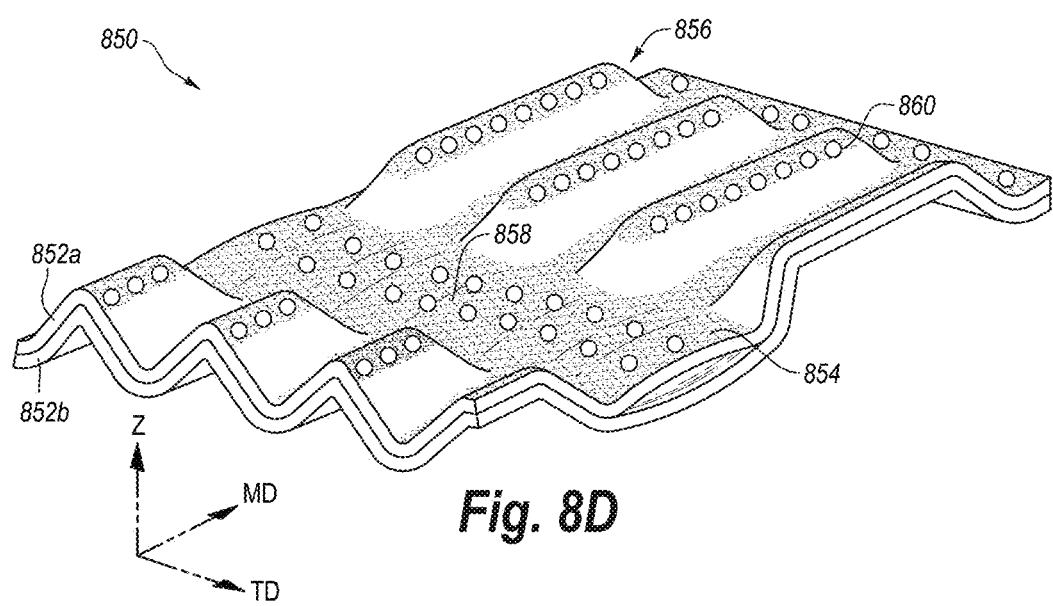
FIG. 8D illustrates a structure of thermoplastic films created by passing multiple layers of thermoplastic film through the intermeshing layers of FIG. 8 and applying an encapsulated fragrance component thereon in accordance with one or more embodiments.

Referring now to FIG. 8D, a structure of thermoplastic films 850 created using the SELF'ing intermeshing rollers 702, 704, is shown. Indeed, in one or more embodiments, in addition to the ability to geometrically deform, the SELF'ing intermeshing rollers 702, 704 can further laminate multiple layers of thermoplastic film. For example, in one or more embodiments, the SELF'ing process discontinuously and lightly laminates adjacent layers of thermoplastic films. In particularly, the thermoplastic films 852a-852b can be lightly laminated at some regions, but un-bonded at other regions, such as the region 854. In some implementations, however, the SELF'ing process fully laminates adjacent layers of thermoplastic films such that the thermoplastic films 852a-852b are fully laminated at all regions.

As further shown in FIG. 8D, the structure of thermoplastic films 850 can include an encapsulated fragrance component. In particular, the structure of thermoplastic films 850 includes a plurality of encapsulants 860 of the encapsulated fragrance component applied across the raised, rib-like elements 856 and the web areas 858 of the thermoplastic film 852a. Further, in one or more embodiments, the structure of thermoplastic films 850 includes the encapsulated fragrance component between the thermoplastic films 852a-852b (e.g., within un-bonded regions of the structure of thermoplastic films 850).

Though FIGS. 7-8D discuss the SELF'ing process and thermoplastic films and bags created from the SELF'ing process, it should be noted that the thermoplastic films and bags described herein can be created from various alternative processes. For example, the thermoplastic films and bags can be created to include a plurality of ribs and a plurality of web areas using a ring rolling process as described in U.S. patent application Ser. No. 15/967,238, filed Apr. 30, 2018, and entitled "NON-CONTINUOUSLY LAMINATED STRUCTURES OF THERMOPLASTIC FILMS WITH DIFFERING MATERIAL COMPOSITIONS AND FUNCTIONAL MATERIAL PROPERTIES" and issued as U.S. Pat. No. 10,293,981, which is incorporated herein by reference in its entirety.

Figure 9:
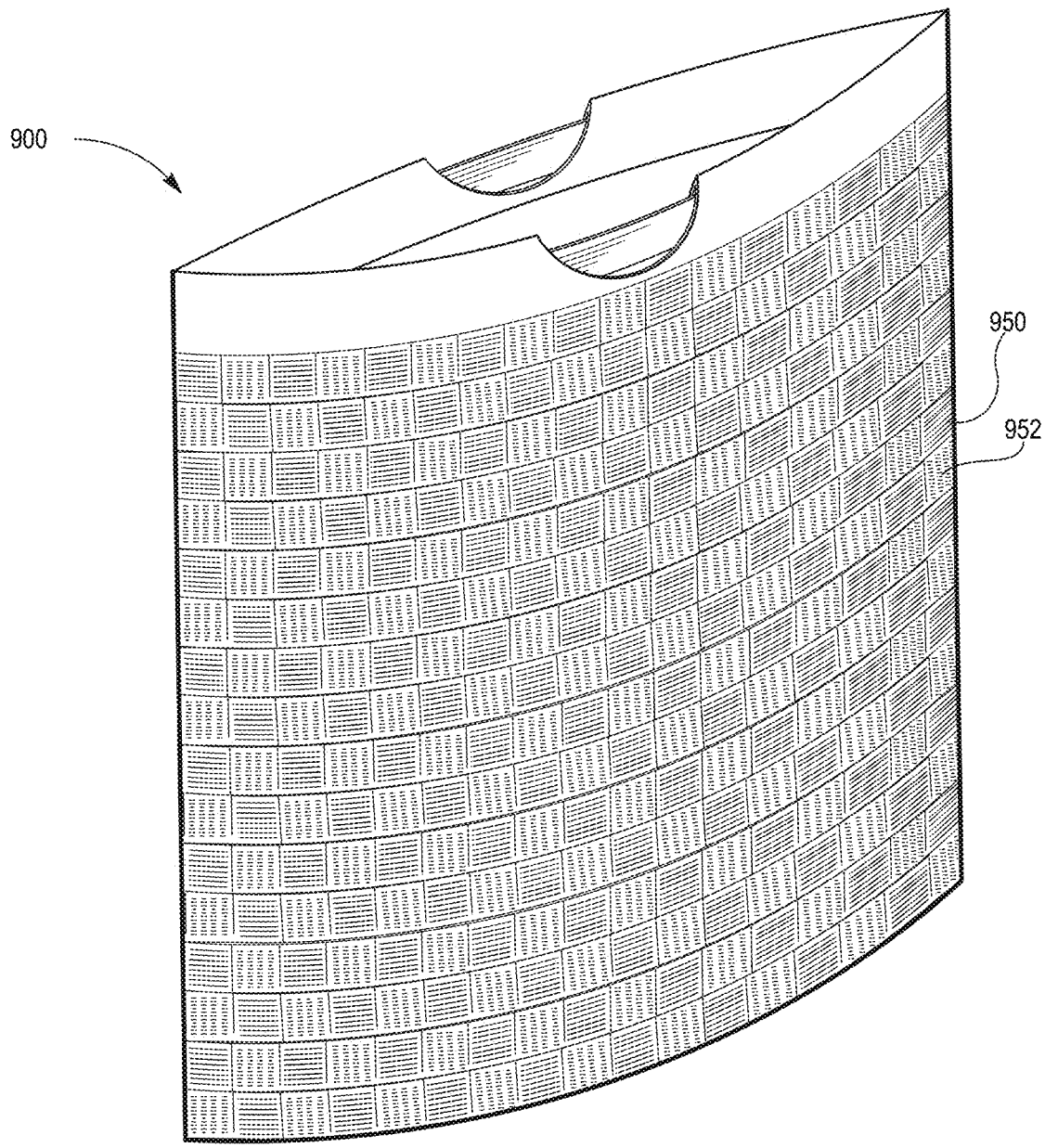
FIG. 9 illustrates a perspective view of thermoplastic bag having a pattern in accordance with one or more embodiments.

FIG. 9 illustrates a thermoplastic bag 900 with sidewalls that are SELF'ed. The thermoplastic bag 900 can include the same structure as one of the thermoplastic bags discussed above albeit with a different pattern of intermittent bonds and thinner webs and thicker ribs. In particular, the thermoplastic bag 900 may include a single pattern of raised like elements arranged in a checkerboard pattern. The pattern can comprise a micro pattern of raised rib-like elements 952 and a macro pattern of raised rib-like elements 950. In one or more embodiments, the encapsulated fragrance component is positioned on the macro patterns. In alternate embodiments, the encapsulated fragrance component is positioned on the micro patterns. In still further embodiments, the encapsulated fragrance component is positioned on both the micro and macro patterns.

Figure 10A:
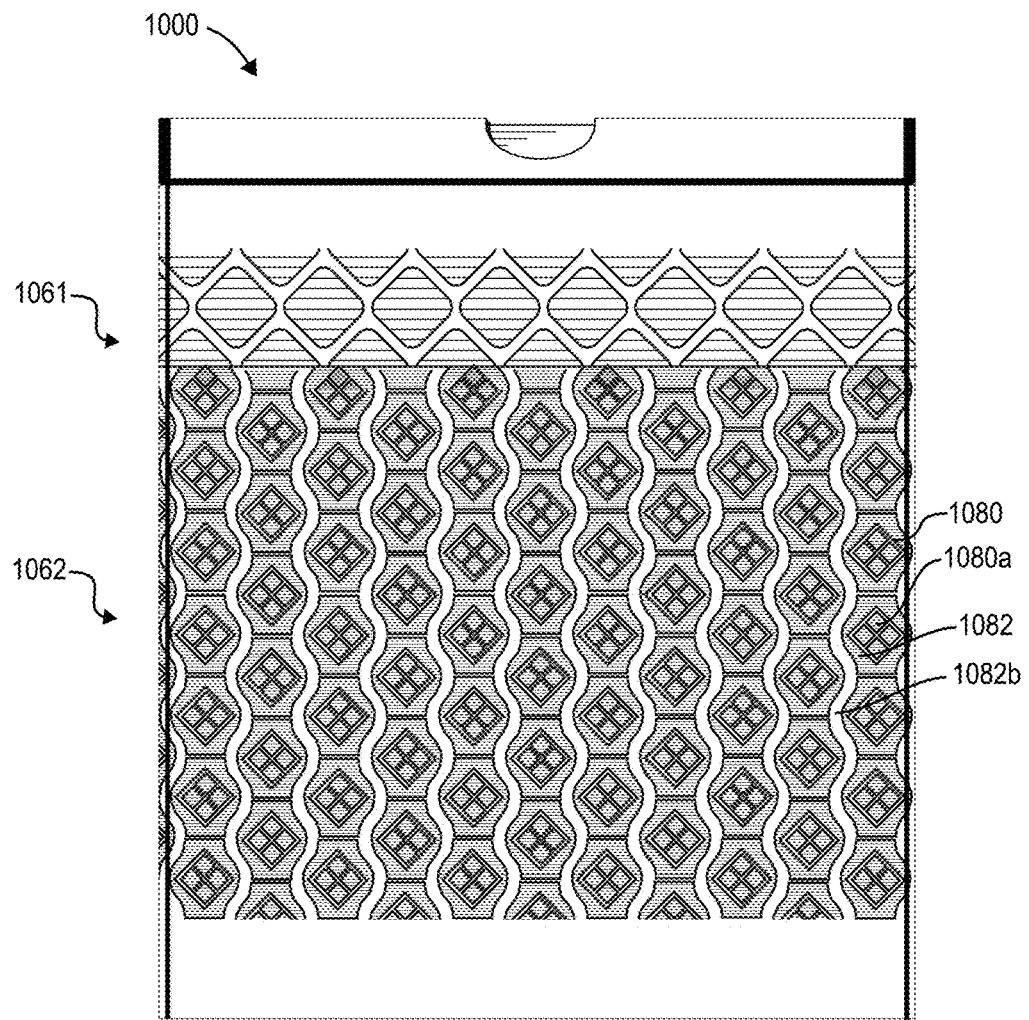
FIGS. 10A-10B illustrate a front view of a thermoplastic bag having another pattern in accordance with one or more embodiments.
Figure 10B:
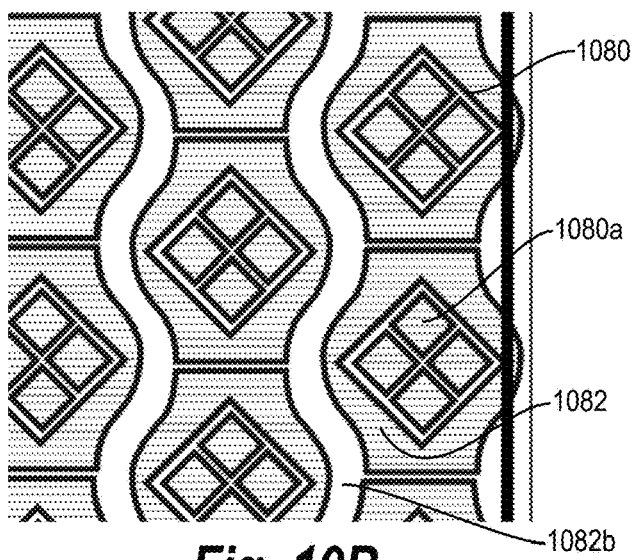
Figure 11A:
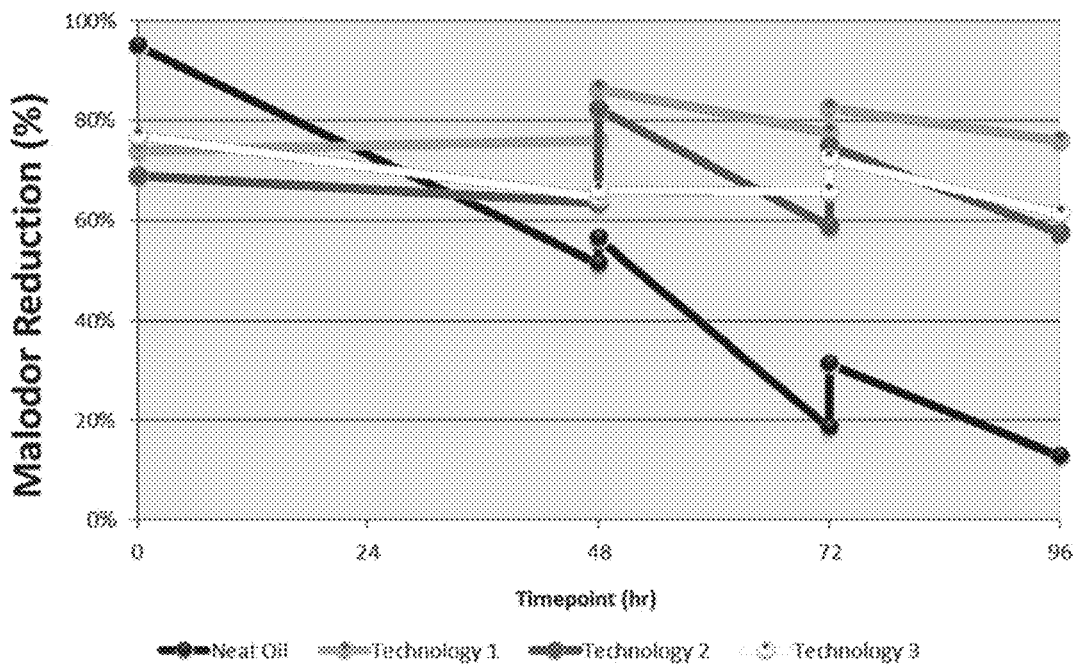
FIGS. 11A-11B illustrate graphs reflecting experimental results regarding the effectiveness of thermoplastic bags having an encapsulated fragrance component disposed thereon in accordance with one or more embodiments.
Figure 11B:
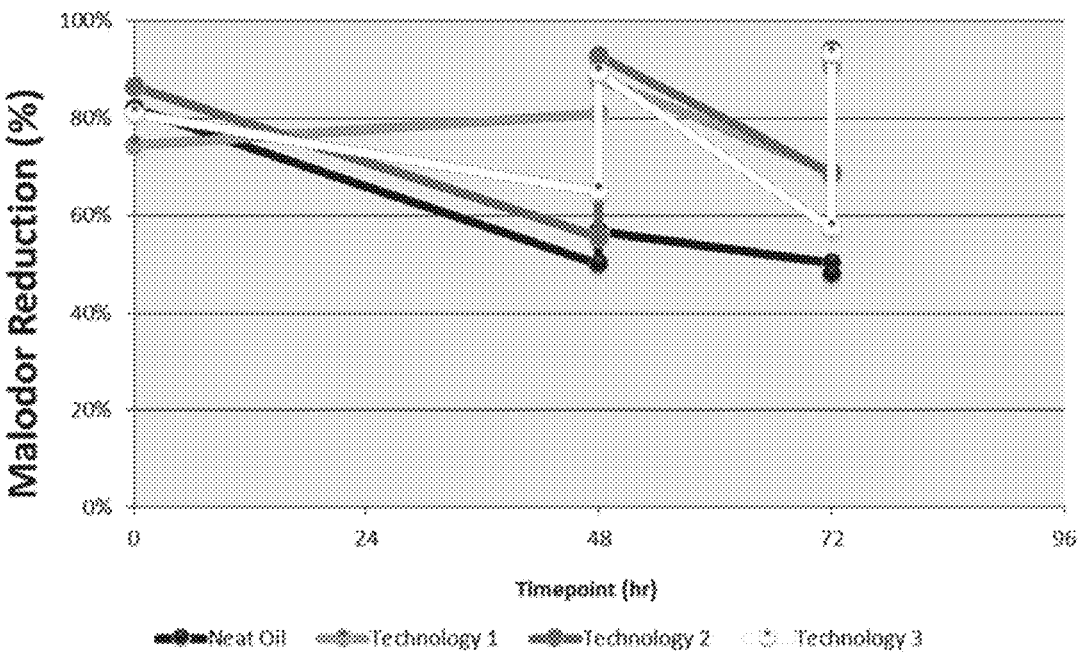

FIG. 10A shows another thermoplastic bag 1000 similar to the thermoplastic bags discussed above. FIG. 10B is an enlarged view of a portion of the thermoplastic bag 1000. Referring to FIGS. 10A and 10B together, one or more of the sidewalls of the thermoplastic bag 1000 have a first plurality of raised rib-like elements 1082 in a macro pattern (e.g., a bulbous pattern) and a second plurality of raised rib-like elements 1080a in a micro pattern (e.g., four diamonds) in a first middle portion 1062. As shown, the second plurality of raised rib-like elements 1080a in the micro pattern are nested within the macro patterns. Furthermore, the thermoplastic bag 1000 includes web areas 1080, 1082b. The web areas 1080, 1082b can surround the micro and the macro patterns of raised rib-like elements. The plurality of web areas 1080, 1082b comprise areas in which the first layer and the second layer are separated to form intermittent bonding between the layers (i.e., the inner bag and the outer bag).

Furthermore, as shown by FIGS. 10A and 10B, the web areas 1082b are arranged in a sinusoidal pattern. In one or more embodiments, the encapsulated fragrance component is positioned on the web areas 1082b. In some implementations, the encapsulated fragrance component is additionally or alternatively positioned on the first plurality of raised rib-like elements 1082 in the macro pattern and/or the second plurality of raised rib-like elements 1080a in the micro pattern. Thus, the thermoplastic bag 1000 can provide phased release of the fragrance from the encapsulated fragrance component in response to different activation triggers, such as different levels of strain applied to the thermoplastic bag 1000.

Additionally, FIGS. 10A and 10B illustrates that the thermoplastic bags described herein can include areas with different patterns. In particular, FIG. 10A illustrates an upper portion 1061 of the thermoplastic bag 1000 including a fenced diamond pattern. The fenced diamond pattern can comprise raised-rib-like elements arranged in diamond patterns where the intersections of the sides of the diamond are rounded rather than ending in corners. The fenced diamond pattern can also comprise areas in which the first layer and the second layer are separated to form intermittent bonding between the layers (i.e., the inner bag and the outer bag). In one or more embodiments, the encapsulated fragrance component is positioned on upper portion 1061.

As indicated above, application of the encapsulated fragrance component allows thermoplastic bags to provide improved odor control. Researchers conducted studies to evaluate the effectiveness of thermoplastic bags having an encapsulated fragrance component (or other encapsulated odor component) applied thereon. FIGS. 10A-10B illustrate graphs reflecting experimental results regarding the effectiveness of thermoplastic bags utilizing an encapsulated fragrance component (or other encapsulated odor control component) to provide odor control in accordance with one or more embodiments.

The researchers compared the performance of thermoplastic bags utilizing various embodiments of an encapsulated odor control component applied thereon (labeled "Technology 1," "Technology 2," and "Technology 3"). In particular, the various embodiments of the encapsulated odor control component include encapsulants having various levels of porosity that would configure the encapsulants to release a portion of the odor-control active over time. For example, the encapsulants for "Technology 1" were configured with a medium level of porosity.

The researchers further compared the performance of the thermoplastic bags having the encapsulated odor control component with a thermoplastic bag utilizing a neat oil applied thereon for odor control. It should be noted that, while the graphs of FIGS. 10A-10B represent thermoplastic bags having one odor control component (e.g., the neat oil or the encapsulated odor control component) disposed thereon, they provide an indication of how dual fragrance odor control using at least one encapsulated fragrance component improves the odor control performance of a thermoplastic bag over time.

The researchers added a combination of malodor sources—the same combination—to each of the thermoplastic bags and measured reduction in malodor provided by each of the thermoplastic bags via a panel. In particular, at a given time period, the panelists measured the malodor within each thermoplastic bag, activated the odor control application (e.g., the encapsulated odor control component or the neat oil application) within the thermoplastic bag (e.g., by applying a strain to the thermoplastic bag) and then re-measured the malodor (e.g., to determine a reduction in the malodor present due to activation).

The thermoplastic bags represented in FIG. 10A had the corresponding odor control application disposed between separate layers of the thermoplastic bag. The thermoplastic bags represented in FIG. 10B had the corresponding odor control application disposed inside the bag (i.e., disposed on an interior surface). As can be shown in both FIGS. 10A and 10B, the thermoplastic bags having the encapsulated odor control component disposed thereon provide improved odor control compared to the thermoplastic bag having the neat oil application. In particular, the thermoplastic bags with the encapsulated odor control component provided a significantly improved reduction in malodor. Further, the thermoplastic bags with the encapsulated odor control component provided a significant reduction in malodor at a given point in time after the encapsulants were activated to release the odor-control active (e.g., the fragrance). It should be noted that any reduction in malodor after "activation" of the neat oil application can be attributed to a rise of the odor-control active located at the bottom of the thermoplastic bag to the headspace after pushing down into the thermoplastic bag to "activate" the odor control. In other words, the neat oil application is not activated as the odor-control active is already exposed upon application.

Figure 12:
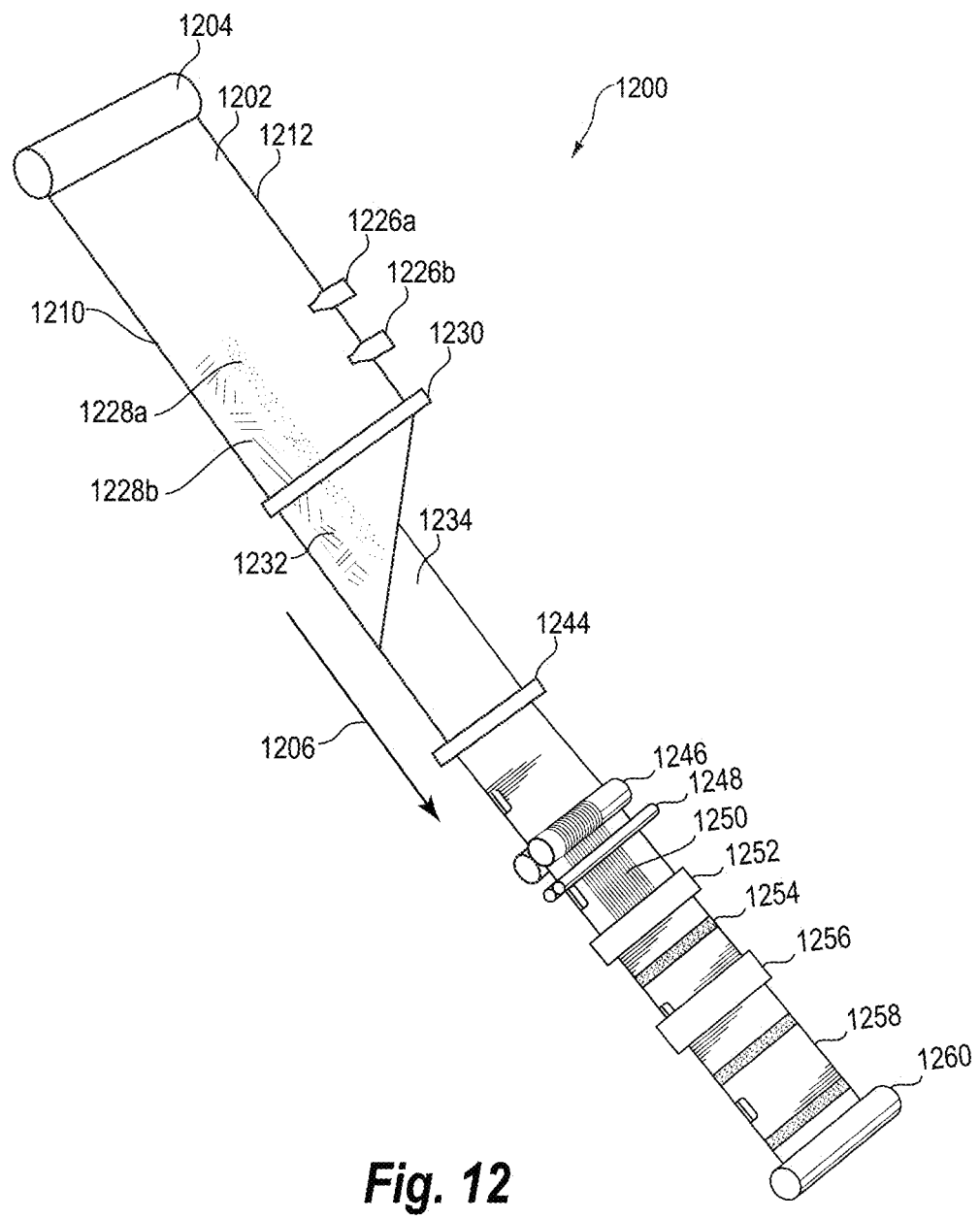
FIG. 12 illustrates a schematic diagram of a manufacturing process for producing thermoplastic bags having dual fragrance odor control in accordance with one or more embodiments.
Figure 13:
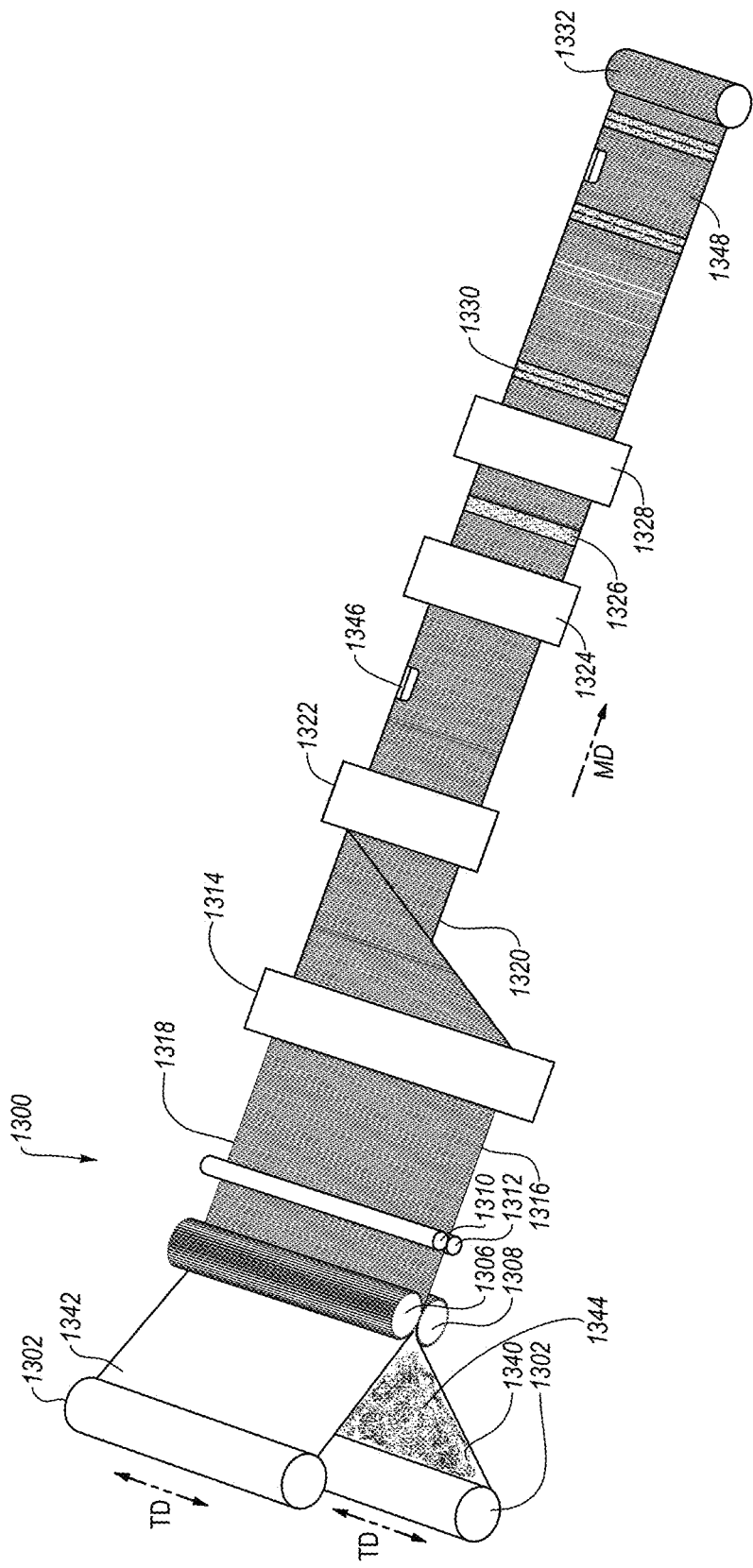
FIG. 13 illustrates a schematic diagram of another manufacturing process for producing thermoplastic bags having dual fragrance odor control in accordance with one or more embodiments.

One or more implementations of the present invention can also include methods of forming thermoplastic bags. FIGS. 12-13 and the accompanying description describe such methods. Of course, as a preliminary matter, one of ordinary skill in the art will recognize that the methods explained in detail herein can be modified. For example, various acts of the method described can be omitted or expanded, additional acts can be included, and the order of the various acts of the method described can be altered as desired.

Referring to FIG. 12 a schematic of an implementation for high-speed automated manufacturing of bags process 1200 is shown. In the illustrated implementation, the process 1200 may begin by unwinding a web 1202 of thermoplastic sheet material from a roll 1204 and advancing the web along a machine direction 1206. The unwound web 1202 may have a rectangular profile including a width that is perpendicular to the machine direction 1206 as measured between a first edge 1210 and an opposite second edge 1212. In other manufacturing environments, the process may involve extruding the web 1202 using a thermoplastic production process.

After unwinding the web 1202, the process 1200 can involve dispensing a substance 1228a containing a first fragrance component using a dispenser 1226a and further dispensing a substance 1228b containing an encapsulated fragrance component using a dispenser 1226b. In one or more embodiments, the dispensers 1226a-1226b apply the substances 1228a-1228b as a series of micro-droplets. In some implementations, however, the dispenser 1226a and/or the dispenser 1226b sprays the respective substance, atomizing the first fragrance component and/or the encapsulated fragrance component for application. Thus, the dispenser 1226a-1226b can increase the surface area covered by the substances 1228a-1228b. Further, where an aqueous carrier is used, by spraying, the dispensers 1226a-1226b can apply a thinner layer of the first fragrance component and/or the encapsulated fragrance component for quicker drying of the aqueous carrier, thereby increasing the chance that the first fragrance component and/or the encapsulated fragrance component will be dry by the time the resulting thermoplastic bag is retrieved for use. In some implementations, the dispensers 1226a-1226b spray the substances 1228a-1228b intermittently to avoid applying the substances 1228a-1228b where the side seals need to be formed (i.e., for better adhesion of the side seals). In one or more embodiments, the substance 1228a and/or the substance 1228b is additionally, or alternatively, applied using a roller or a slot cast. It should be noted that the positioning of the substances 1228a-1228b on the web 1202 are for illustration purposes. Indeed, the dispensers 1226a-1226b can be configured to position the substances 1228a-1228b in a variety of locations on the web 1202.

In some implementations, the process 1200 utilizes alternative methods for applying the substance 1228a containing the first fragrance component and/or the substance 1228b containing the encapsulated fragrance component. For example, the process 1200 can apply the substance 1228a and/or the substance 1228b via prills, coacervation/emulsion, dripping/gelation, or coating.

In one or more embodiments, the substance 1228a and/or the substance 1228b includes a liquid application (e.g., an aqueous carrier), a powder application or any other application discussed above. In one or more embodiments, the substance 1228a and/or the substance 1228b is applied with a deposition aid (e.g., methyl cellulose) to improve adhesion of the substance without making the bag sticky when a consumer tries to open the bag. To illustrate, the deposition aid can include a water-soluble resin/binder, such as hydroxypropyl methylcellulose (HPMC), polyethylene glycol, polyethylene oxide, polyvynilpyrrolidone, alginate, polyvinyl alcohol, celluloses (e.g., hydroxypropyl cellulose, carboxymethyl cellulose, hydroxypropyl methylcellulose) or pullulan. In some instances, the deposition aid includes water-insoluble resins/binders (e.g., nitrocellulose, CAB, acrylates, urethanes, etc.). Such a deposition aid can be used, for instance, in combination with encapsulants triggered to release their odor-control active in response to contact with water. In some implementations, the deposition aid includes one or more hot melts or acrylates.

In some embodiments, the substance 1228a and/or the substance 1228b is applied with an ultraviolet (UV) indicator to provide visual evidence of the spray pattern (e.g., under a black light) or to help identify a clogged nozzle during manufacturing. In some implementations, the substance 1228a and/or the substance 1228b is applied with a color indicator so that a consumer can visually identify a location of the first fragrance component and/or encapsulated fragrance component, respectively. For example, the color indicator can include an oil soluble dye encapsulated within the encapsulants of the encapsulated fragrance component, which allows a consumer to see where activation is occurring. In some embodiments, the color indicator includes a water-soluble dye that is mixed into the aqueous phase of the first fragrance component and/or the encapsulated fragrance component to show the consumer where the first fragrance component and/or the encapsulated fragrance component, respectively, has been applied.

As mentioned above, the process 1200 can be modified so that the act of applying the substances containing the first fragrance component and the encapsulated fragrance component can occur earlier or later than what is shown in FIG. 12. For example, in one or more embodiments, the substance 1228a containing the first fragrance component and/or the substance 1228b containing the encapsulated fragrance component (or the encapsulated fragrance component itself) can be coextruded with the web 1202 using the thermoplastic production process.

Subsequently, the process 1200 can include a folding process 1230 that involves folding the web 1202 about its width and in-line with the machine direction 1206 to provide adjacent first and second folded halves 1232, 1234. The folding of the web 1202 may cause the second edge 1212 to move adjacent to the first edge 1210 such that the two edges correspond to the opened top edge of the finished bag. The mid-width portion of the web 1202 may correspond to the reinforced bottom edge portion of the finished bag which may move in parallel with the machine direction 1206. Additionally, the folded halves 1232, 1234 of the web 1202 correspond to the first and second sidewalls of the finished bag. As suggested above, applying the substances containing the first fragrance component and/or the encapsulated fragrance component can occur after the folding process 1230. For example, in some implementations, the process 1200 utilizes one or more dispensers that insert into an open portion of the folded bag and applies the substances accordingly.

Additional processing steps may be applied to produce the finished bag. In particular, the process 1200 can include a draw tape insertion process 1244 that involves inserting a draw tape into the first edge 1210 and the second edge 1212 of the web 1202.

Optionally, to bond (and optionally stretch) the halves of the web, the processing equipment may include a pair of intermeshing rollers 1246 such as those described herein above. The folded halves 1232, 1234 may be advanced along the machine direction 1206 between the intermeshing rollers 1246, which may be set into rotation in opposite rotational directions to impart the resulting bonding pattern 1250. To facilitate patterning of the folded halves 1232, 1234, the intermeshing rollers 1246 may be forced or directed against each other by, for example, hydraulic actuators. The pressure at which the rollers are pressed together may be in a first range from 30 PSI (2.04 atm) to 100 PSI (6.8 atm), a second range from 60 PSI (4.08 atm) to 90 PSI (6.12 atm), and a third range from 75 PSI (5.10 atm) to 85 PSI (5.78 atm). In one or more implementations, the pressure may be about 80 PSI (5.44 atm).

In the illustrated implementation, the intermeshing rollers 1246 may be arranged so that they are co-extensive with or wider than the width of the folded halves 1232, 1234. In one or more implementations, the bonding pattern 1250 created by intermeshing rollers 1246 may extend from proximate the folded edge to the adjacent edges 1210, 1212. To avoid imparting the bonding pattern 1250 onto the portion of the folded halves 1232, 1234 that includes the draw tape, the corresponding ends of the intermeshing rollers 1246 may be smooth and without the ridges and grooves. Thus, the adjacent edges 1210, 1212 and the corresponding portion of the folded halves 1232, 1234 proximate those edges that pass between the smooth ends of the intermeshing rollers 1246 may not be imparted with the bonding pattern 1250.

The processing equipment may include pinch rollers 1248 to accommodate the width of the folded halves 1232, 1234. To produce the finished bag, the processing equipment may further process the folded halves 1232, 1234. For example, to form the parallel side edges of the finished bag, the folded halves 1232, 1234 may proceed through a sealing operation 1252 in which heat seals 1254 may be formed between the folded edge and the adjacent edges 1210, 1212. The heat seals may fuse together the adjacent folded halves 1232, 1234. The heat seals 1254 may be spaced apart along the folded halves 1232, 1234 and in conjunction with the folded outer edge may define individual bags. The heat seals 1254 may be made with a heating device, such as, a heated knife or a sealing bars as described in greater detail below. A perforating operation 1256 may perforate the heat seals 1254 with a perforating device, such as, a perforating knife so that individual bags 1258 may be separated from the web 1202. In one or more implementations, the folded halves 1232, 1234 may be folded one or more times before the folded halves 1232, 1234 may be directed through the perforating operation. The folded halves 1232, 1234 embodying the individual bags 1258 may be wound into a roll 1260 for packaging and distribution. For example, the roll 1260 may be placed in a box or a bag for sale to a customer.

In one or more implementations of the process 1200, a cutting operation may replace the perforating operation 1256. The web is directed through a cutting operation which cuts the folded halves 1232, 1234 at location into individual bags 1258 prior to winding onto a roll 1260 for packaging and distribution. For example, the roll 1260 may be placed in a box or bag for sale to a customer. The bags may be interleaved prior to winding into the roll 1260. In one or more implementations, the folded halves 1232, 1234 may be folded one or more times before the folded web is cut into individual bags. In one or more implementations, the individual bags 1258 may be positioned in a box or bag, and not onto the roll 1260.

Though not shown in FIG. 12, in one or more embodiments, the process 1200 involves packaging multiple bags into a box, a bag, or other container where at least one of the bags has a scent that is different than the scent(s) associated with the other bags. Indeed, the process 1200 can involve positioning multiple bags of different scents within the same packaging material. In some embodiments, the process 1200 can involve placing the multiple bags of different scents within the same packing material without separating the different scented bags. For example, the process 1200 can involve including the multiple bags of different scents within a single roll of bags that is then positioned within a box, a bag, or another container.

In one or more embodiments, the process 1200 utilizes multiple encapsulated fragrance components having fragrances of different scents to package the multiple bags of different scents together. To illustrate, the process 1200 can involve utilizing an additional dispenser to dispense a substance containing an additional encapsulated fragrance component onto one or more bags. The additional encapsulated fragrance component can encapsulate a fragrance having a different scent than the fragrance associated with the encapsulated fragrance component included in the substance 1228b. For example, the process 1200 can involve alternating between utilizing the dispenser 1226b to dispense the substance 1228b containing the encapsulated fragrance component and the additional dispenser to dispense the substance containing the additional encapsulated fragrance component (e.g., every other bag). As another example, the process can utilize the dispenser 1226b to dispense the substance 1228b containing the encapsulated fragrance component onto an initial set of bags to be packaged into a container and further utilize the additional dispenser to dispense the substance containing the additional encapsulated fragrance component onto subsequent set of bags to be packaged into the same container.

By utilizing encapsulated fragrance components, multiple bags having fragrances of different scents can be included in the same packaging (e.g., without separation) and avoid having the different fragrances mix together. Indeed, because the encapsulated fragrance components will retain their respective fragrances until activated, the different fragrances are protected from release and intermingling.

Accordingly, the process 1200 can facilitate a multi-scented experience within the same package of bags using bags of different scents.

FIG. 13 illustrates an exemplary embodiment of a manufacturing process for making multi-layer thermoplastic film (e.g., the first and second films 1340, 1342) having the encapsulated fragrance component 1344 (e.g., a substance containing the encapsulated fragrance component 1344) and a first fragrance component (not shown) disposed therein and then producing multi-layer thermoplastic bags therefrom. According to the process 1300, a first film 1340 and a second film 1342 may be unwound from stock rolls 1302, respectively, and directed along a machine direction MD. Alternatively, the first and second films 1340, 1342 may be extruded directly from one or more extrusion towers rather than stock rolls 1302.

The encapsulated fragrance component 1344 (e.g., one or more substances containing the encapsulated fragrance component 1344) may be applied to one or more of the first and second films 1340, 1342 on the inner sides of the first and second films 1340, 1342 (e.g., the sides of the first and second films 1340, 1342 that will be bonded together) prior to bonding the first and second films 1340, 1342. The encapsulated fragrance component 1344 may be applied through one or more of laminating, dusting, spraying, rolling, and any other method known in the art for applying substances to films. In one or more embodiments, the encapsulated fragrance component 1344 (or a substance containing the encapsulated fragrance component 1344) is coextruded with the first and second films 1340, 1342. Likewise, the first fragrance component (not shown) or a substance containing the first fragrance component may be applied to one or more of the first and second films 1340, 1342 on the inters sides of the first and second films 1340, 1342 prior to bonding the first and second films 1340, 1342.

After the encapsulated fragrance component 1344 and the first fragrance component have been applied to one or more of the first and second films 1340, 1342, the first and second films 1340, 1342 may be passed between a pair of cylindrical intermeshing rollers 1306, 1308 to incrementally stretch and lightly laminate the initially separate first and second films 1340, 1342 to create un-bonded regions and bonded regions in at least one section of a multi-layer film (i.e., eventual sidewall of the multi-layer bag). The intermeshing rollers 1306, 1308 shown in FIG. 13 may have a construction similar to that of any of the intermeshing rollers described in U.S. Pat. No. 8,603,609 or those shown above with reference to FIG. 7. The rollers 1306, 1308 may be oriented such that longitudinal axes of the rollers are perpendicular to the machine direction. Additionally, the rollers 1306, 1308 may rotate about their longitudinal axes in opposite rotational directions. In some embodiments, motors may be provided to power rotation of the rollers 1306, 1308 in a controlled manner. As the first and second films 1340, 1342 pass between the pair of rollers 1306, 1308, the ridges and/or teeth of the rollers 1306, 1308 can form the multi-layer film (i.e., eventual sidewall of the multi-layer bag).

During the manufacturing process 1300, the multi-layer film can also pass through a pair of pinch rollers 1310, 1312. The pinch rollers 1310, 1312 can be appropriately arranged to grasp the multi-layer film.

A folding operation 1314 can fold the multi-layer film to produce the sidewalls of the finished bag. The folding operation 1314 can fold the multi-layer film in half along the transverse direction. In particular, the folding operation 1314 can move a first edge 1316 adjacent to the second edge 1318, thereby creating a folded edge 1320. For example, the process may include the folding operation described in U.S. Pat. No. 8,568,283, the entire contents of which are hereby incorporated by reference in their entirety. Additionally, the folding operation 1314 may form a hem at an eventual top portion of a thermoplastic film.

To produce the finished bag, the processing equipment may further process the folded multi-layer film. In particular, a draw tape operation 1322 can insert a draw tape 1346 into the first edge 1316 and the second edge 1318 of the multi-layer film. Furthermore, a sealing operation 1324 can form the parallel side edges of the finished bag by forming heat seals 1326 between adjacent portions of the folded multi-layer lightly-laminated film. Moreover, the sealing operation 1324 can seal the hem to a sidewall of the eventual thermoplastic bag. The heat seal 1326 may strongly bond adjacent layers together in the location of the heat seal 1326 so as to tightly seal the edges (e.g., produce an at least substantially watertight seal) of the finished bag. The heat seals 1326 may be spaced apart along the folded multi-layer film to provide a desired width to the finished bags. The sealing operation 1324 can form the heat seals 1326 using a heating device, such as, a heated knife.

A perforating operation 1328 may form a perforation 1330 in the heat seals 1326 using a perforating device, such as, a perforating knife. The perforations 1330 in conjunction with the folded outer edge 1320 can define individual bags 1348 that may be separated from the multi-layer film. A roll 1332 can wind the multi-layer lightly-laminated film embodying the finished individual bags 1348 for packaging and distribution. For example, the roll 1332 may be placed into a box or bag for sale to a customer.

In still further implementations, the folded multi-layer lightly-laminated film may be cut into individual bags along the heat seals 1326 by a cutting operation. In another implementation, the folded multi-layer lightly-laminated film may be folded one or more times prior to the cutting operation. In yet another implementation, the side sealing operation 1324 may be combined with the cutting and/or perforation operations 1328.

In further embodiments, the hem of the thermoplastic bag may be ring rolled and/or SELF'ed to form a pattern in the hem. Moreover, the hem of the thermoplastic bag may be ring rolled and/or SELF'ed prior to being folded into a hem shape and/or after being folded into a hem shape.

One will appreciate in view of the disclosure herein that the process 1300 described in relation to FIG. 13 can be modified to omit or expanded acts, or vary the order of the various acts as desired. In particular, the process 1300 can involve placing or applying an encapsulated odor control component such that the encapsulated odor control component is positioned in or around the hem as described below.

The present disclosure may be embodied in other specific forms without departing from its spirit or essential characteristics. For example, the illustrated and described implementations involve non-continuous (i.e., discontinuous or partially discontinuous lamination) to provide the weak bonds. In alternative implementations, the lamination may be continuous. For example, multi film layers could be coextruded so that the layers have a bond strength that provides for delamination prior to film failure to provide similar benefits to those described above. Thus, the described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A bag, comprising:
a first sidewall comprising a first layer of thermoplastic material;
a second sidewall opposite the first sidewall and joined with the first sidewall along a first side edge, an opposite second side edge, and a bottom edge;
a first fragrance component applied to the first layer of thermoplastic material on an interior surface of the first sidewall; and
an encapsulated fragrance component applied to the first layer of thermoplastic material on the interior surface of the first sidewall, wherein the encapsulated fragrance component comprises a fragrance encapsulated within a plurality of encapsulants configured to become brittle when dry to enable the plurality of encapsulants to break and release the fragrance in response to a physical interaction applied to a surface of the first layer of thermoplastic material.

2. The bag of claim 1, wherein:
the first fragrance component comprises an additional fragrance having a first scent; and
the fragrance of the encapsulated fragrance component comprises a second scent that is different than the first scent.

3. The bag of claim 1, wherein the first fragrance component comprises neat oil.

4. The bag of claim 1, further comprising an additional encapsulated fragrance component applied to the first layer of thermoplastic material, wherein the additional encapsulated fragrance component comprises an additional fragrance encapsulated within an additional plurality of encapsulants and is configured to delay a release of the additional fragrance.

5. The bag of claim 4, wherein:
the plurality of encapsulants of the encapsulated fragrance component is disposed on a first portion of the first layer of thermoplastic material;
the additional plurality of encapsulants of the additional encapsulated fragrance component is disposed on a second portion of the first layer of thermoplastic material; and
a position of the plurality of encapsulants relative to a position of the additional plurality of encapsulants is configured to cause:
the plurality of encapsulants to activate to release the fragrance in response to a first trigger applied to the first layer of thermoplastic material; and
the additional plurality of encapsulants to activate to release the additional fragrance in response to a second trigger applied to the first layer of thermoplastic material.

6. The bag of claim 1, wherein the encapsulated fragrance component is configured to delay a release of the fragrance by retaining the fragrance within the plurality of encapsulants until activated to release the fragrance in response to the physical interaction comprising at least one of a physical strain or a friction applied to the first layer of thermoplastic material.

7. The bag of claim 6, wherein the plurality of encapsulants of the encapsulated fragrance component adhere to the interior surface of the first layer of thermoplastic material.

8. The bag of claim 1, wherein the encapsulated fragrance component is configured with a porosity characteristic to release at least a portion of the fragrance over time.

9. The bag of claim 1, further comprising a second layer of thermoplastic material adjacent to the first layer of thermoplastic material, wherein the encapsulated fragrance component is also disposed between the first layer of thermoplastic material and the second layer of thermoplastic material.

10. A thermoplastic bag, comprising:
a first sidewall;
a second sidewall opposite the first sidewall and joined with the first sidewall along a first side edge, an opposite second side edge, and a bottom edge;
a first fragrance component applied to an interior surface of at least one of the first sidewall or the second sidewall; and
an encapsulated fragrance component applied to the interior surface of at least one of the first sidewall or the second sidewall, wherein the encapsulated fragrance component comprises a fragrance encapsulated within a plurality of encapsulants configured to become brittle when dry to enable the plurality of encapsulants to break and release the fragrance in response to a physical interaction applied to a surface of the first sidewall or the second sidewall.

11. The thermoplastic bag of claim 10, wherein:
at least the first sidewall or the second sidewall comprises:
a plurality of ribs; and
a plurality of web areas, the plurality of web areas separating and connecting ribs of the plurality of ribs, wherein the plurality of web areas is out of plane with the ribs of the plurality of ribs so as to create recesses between adjacent ribs of the plurality of ribs;
the encapsulated fragrance component is disposed across the ribs and the plurality of web areas; and
the ribs and the plurality of web areas are configured to cause the plurality of encapsulants to activate to release the fragrance in phases.

12. The thermoplastic bag of claim 10, further comprising an encapsulated odor control component applied to at least one of the first sidewall or the second sidewall, wherein the encapsulated odor control component comprises an odor-control active encapsulated within an additional plurality of encapsulants and is configured to delay a release of the odor-control active.

13. The thermoplastic bag of claim 10, wherein:
the fragrance of the encapsulated fragrance component comprises a first scent; and
the first fragrance component comprises an additional fragrance having a second scent that is within a same family of scents as the first scent.

14. The thermoplastic bag of claim 10, wherein:
the fragrance of the encapsulated fragrance component comprises a first scent; and
the first fragrance component comprises an additional fragrance having a second scent associated with a second family of scents that is different than a first family of scents associated with the first scent.

15. The thermoplastic bag of claim 10, wherein the encapsulated fragrance component is configured to delay a release of the fragrance by retaining the fragrance within the plurality of encapsulants until activated to release the fragrance in response to the physical interaction comprising at least one of a physical strain or a friction applied to the at least one of the first sidewall or the second sidewall.

16. The thermoplastic bag of claim 10, wherein the encapsulated fragrance component is configured with a porosity characteristic and configured to delay a release of the fragrance by releasing at least a portion of the fragrance over time based on the porosity characteristic.

17. The thermoplastic bag of claim 10, wherein:
at least one of the first sidewall or the second sidewall comprises a first film of thermoplastic material and a second film of thermoplastic material; and
the encapsulated fragrance component is disposed between the first film of thermoplastic material and the second film of thermoplastic material.

18. The bag of claim 1, wherein the plurality of encapsulants comprise formaldehyde-based shells that are pliable in liquid form to enable application of the encapsulated fragrance component to the first layer of thermoplastic material and that become brittle when dry by to enable the plurality of encapsulants to break and release the fragrance in response to the physical interaction.

19. The bag of claim 1, wherein the encapsulated fragrance component applied to the first layer of thermoplastic material on the interior surface of the first sidewall comprises the encapsulated fragrance component disposed within a hem of the bag.

20. The bag of claim 19, wherein the plurality of encapsulants are configured to break and release the fragrance in response to the physical interaction comprising a drawstring disposed within the hem moving through the hem.

* * * * *